(12) United States Patent
Zhou et al.

(10) Patent No.: US 7,376,241 B2
(45) Date of Patent: May 20, 2008

(54) DISCRETE FOURIER TRANSFORM (DFT) WATERMARK

(75) Inventors: Wensheng Zhou, Los Angeles, CA (US); Hua Xie, Alhambra, CA (US)

(73) Assignee: The Boeing Company, Chicago, IL (US)

( * ) Notice: Subject to any disclaimer, the term of this patent is extended or adjusted under 35 U.S.C. 154(b) by 838 days.

(21) Appl. No.: 10/635,347

(22) Filed: Aug. 6, 2003

(65) Prior Publication Data
US 2005/0036613 A1    Feb. 17, 2005

(51) Int. Cl.
*G06K 9/00* (2006.01)
(52) U.S. Cl. ..................................... 382/100
(58) Field of Classification Search ............ 713/150, 713/176; 382/100, 232; 348/460
See application file for complete search history.

(56) References Cited

U.S. PATENT DOCUMENTS

| | | | | |
|---|---|---|---|---|
| 6,590,996 | B1 * | 7/2003 | Reed et al. ................ | 382/100 |
| 7,123,741 | B2 * | 10/2006 | Ono ........................... | 382/100 |
| 2003/0077002 | A1 * | 4/2003 | Silverstein et al ......... | 382/282 |
| 2003/0228031 | A1 * | 12/2003 | Rhoads ...................... | 382/100 |
| 2004/0050931 | A1 * | 3/2004 | Ono et al. .................. | 235/380 |
| 2004/0086200 | A1 * | 5/2004 | Aas ............................ | 382/298 |

FOREIGN PATENT DOCUMENTS

EP    0 746 126 A2    12/1996
EP    0 798 892 A2    10/1997
EP    0 982 927 A1    3/2000

OTHER PUBLICATIONS

Augot, D., et al., "Secure Delivery of Images Over Open Networks", Special issue on identification and protection of multimedia information, Proceedings of the IEEE, Jul. 1999, 87(7): 1251-1266.
Cox, Ingemar J., et al., "Secure Spread Spectrum Watermarking for Multimedia", *IEEE Transactions On Image Processing*, vol. 6, No. 12, Dec. 1997, pp. 1673-1687.

(Continued)

*Primary Examiner*—Matthew C. Bella
*Assistant Examiner*—Claire Wang
(74) *Attorney, Agent, or Firm*—Gates & Cooper LLP

(57) ABSTRACT

A Discrete Fourier Transform watermark for use with digital images/video. A Y component of a Y, U(Cb), V(Cr) digital data stream representing color components of digital video is extracted as the digital data for embedding the watermark. The digital data is then scaled to a standard size. A Discrete Fourier Transform (DFT) is performed on the digital data, and a magnitude domain of the Discrete Fourier Transform is computed. The watermark is embedded into selected frequency bands of the computed magnitude domain of the Discrete Fourier Transform, thereby creating a watermarked magnitude domain. The selected frequency bands comprise one or more middle frequency bands, and the middle frequency bands comprise a band of circular rings of the magnitude domain. An inverse Discrete Fourier Transform is performed on the watermarked magnitude domain to reconstruct the digital data with the embedded watermark.

16 Claims, 22 Drawing Sheets

OTHER PUBLICATIONS

Koch, Eckhard, et al., "Copyright Protection for Multimedia Data", Fraunhofer Institute for Computer Graphics, Darmstadt, Germany, Dec. 16, 1994, pp. 1-15.

Haitsma, J., et al., "A Watermarking Scheme For Digital Cinema", Proceedings of the International Conference On Image Processing, 'Online! Oct. 7-10, 2001, pp. 487-489, XP002249974 Thessaloniki.

Swanson, Mitchell D., et al., "Multiresolution Scene-Based Video Watermarking Using Perceptual Models", *IEEE Journal On Selected Areas In Communications*, vol. 16, No. 4, May 1998, pp. 540-550.

Zhou, Wensheng, et al., "On-line Scene Change Detection of Multicast Video", *IEEE Journal of Visual Communication and Image Representation*, vol. 12, Mar. 2001, pp. 1-16.

Shapiro, Jerome M., "Embedded Image Coding Using Zerotrees of Wavelet Coefficients", *IEEE Transactions on Signal Processing*, vol. 41, No. 12, Dec. 1993, pp. 3445-3462.

Stromberg, Michael, "Secure Content Protection: An Overview of the Proposed Security Mechanisms In Digital Cinema", KTH Advanced Media Technology Lab, 'Online! Sep. 20, 2001, XP002249975 Stockholm, retrieved from the Internet: URL:www.amt.kth.es on Aug. 1, 2003, 17 pages.

Said, Amir, et al., "A New, Fast, and Efficient Image Codec Based On Set Partitioning In Hierarchical Trees", *IEEE Transactions On Circuits and Systems For Video Technology*, vol. 6, No. 3, Jun. 1996, pp. 243-250.

Wolfgang, Raymond B., et al., "Perceptual Watermarks for Digital Images and Video", *Proceedings of the IEEE*, vol. 87, No. 7, Jul. 1999, pp. 1108-1126.

Lin, C. Y., et al., "Rotation, Scale, and Translation Resilient Watermarking for Images", IEEE, Trans. On Image Processing, vol. 10, pp. 767-782, May 2001.

Pereira, S., et al., "Fast Robust Template Matching for Affine Resistant Image Watermarks", Proc. $3^{rd}$ Int. Information Hiding Workshop, pp. 207-218, 1999.

Solachidis, V., et al., "Circularly Symmetric Watermark Embedding in 2-D DFT Domain", IEEE Trans. On Image Processing, vol. 10, pp. 1741-1753, Nov. 2001.

* cited by examiner

DISCRETE FOURIER TRANSFORM (DFT) WATERMARK

CROSS-REFERENCE TO RELATED APPLICATIONS

This application is related to the following co-pending and commonly-assigned patent applications:

U.S. Utility patent application Ser. No. 10/419,490, filed on Apr. 21, 2004, by Ismael Rodriguez, entitled WATERMARKS FOR SECURE DISTRIBUTION OF DIGITAL DATA, which application claims the benefit under 35 U.S.C. §119(e) of co-pending and commonly-assigned U.S. Provisional Patent Application Ser. No. 60/376,106, filed Apr. 29, 2002, by Ismael Rodriguez, entitled WATERMARK SCHEME FOR SECURE DISTRIBUTION OF DIGITAL IMAGES AND VIDEO, U.S. Utility patent application Ser. No. 10/419,491, filed on Apr. 21, 2003, by Ismael Rodriguez, entitled VISIBLE WATERMARK TO PROTECT MEDIA CONTENT FROM A SERVER TO PROJECTOR, which application claims the benefit under 35 U.S.C. §119(e) of co-pending and commonly-assigned U.S. Provisional Patent Application Ser. No. 60/376,303, filed Apr. 29, 2002, by Ismael Rodriguez, entitled VISIBLE WATERMARK TO PROTECT MEDIA CONTENT FROM A SERVER TO PROJECTOR, U.S. Utility patent application Ser. No. 10/419,489, filed on Apr. 21, 2003, by Troy Rockwood and Wensheng Zhou, entitled NON-REPUDIATION WATERMARKING PROTECTION BASED ON PUBLIC AND PRIVATE KEYS, which application claims the benefit under 35 U.S.C. §119(e) of co-pending and commonly-assigned U.S. Provisional Patent Application Ser. No. 60/376,212, filed Apr. 29, 2002, by Troy Rockwood and Wensheng Zhou, entitled NON-REPUDIATION WATERMARKING PROTECTION APPARATUS AND METHOD BASED ON PUBLIC AND PRIVATE KEY, U.S. Utility patent application Ser. No. 10/419,495, filed on Apr. 21, 2003, by Wensheng Zhou and Phoom Sagetong, entitled DYNAMIC WAVELET FEATURE-BASED WATERMARK, which application claims the benefit under 35 U.S.C. §119(e) of co-pending and commonly-assigned U.S. Provisional Patent Application Ser. No. 60/376,092, filed Apr. 29, 2002, by Wensheng Zhou and Phoom Sagetong, entitled DYNAMIC WAVELET FEATURE-BASED WATERMARK APPARATUS AND METHOD FOR DIGITAL MOVIES IN DIGITAL CINEMA, and U.S. Utility patent application Ser. No. 10/131,104, filed on Apr. 24, 2002, by Troy Dean Rockwood, Bong Kyun Ryu, Wensheng Zhou and Yongguang Zhang, entitled SYSTEM AND METHODS FOR DIGITAL CONTENT DISTRIBUTION, all of which applications are incorporated by reference herein.

BACKGROUND OF THE INVENTION

1. Field of the Invention

The invention relates to the field of digital watermarks, and more particularly, to a Discrete Fourier Transform (DFT) watermark.

2. Description of the Related Art (This application references a number of publications, as indicated in the specification by a reference number enclosed in brackets, e.g., [x]. These publications, along with their associated reference numbers, are identified in the section below entitled "References.")

With the recent growth of networked multimedia systems, techniques are needed to prevent (or at least deter) the illegal copying, forgery and distribution of media content comprised of digital audio, images and video. Many approaches are available for protecting such digital data, including encryption, authentication and time stamping.

One way to improve a claim of ownership over digital data, for instance, is to place a low-level signal or structure directly into the digital data. This signal or structure, known as a digital watermark, uniquely identifies the owner and can be easily extracted from the digital data. If the digital data is copied and distributed, the watermark is distributed along with the digital data. This is in contrast to the (easily removed) ownership information fields allowed by the MPEG-2 syntax.

Digital watermarking is an emerging technology. Several digital watermarking methods have been proposed.

For example, Cox et al. in [1] proposed and patented a digital watermark technology that is based on a spread spectrum watermark, wherein the watermark is embedded into a spread spectrum of video signals, such as Fast Fourier Transform (FFT) or Discrete Cosine Transform (DCT) coefficients.

Koch, Rindfrey and Zhao in [2] also proposed two general watermarks using DCT coefficients. However, the resulting DCT has no relationship to that of the image and, consequently, may be likely to cause noticeable artifacts in the image and be sensitive to noise.

A scene-based watermark has been proposed by Swanson, Zhu and Tewfik in [3]. In this method, each of a number of frames of a scene of video data undergoes a temporal wavelet transform, from which blocks are extracted. The blocks undergo perceptual masking in the frequency domain, such that a watermark is embedded therein. Once the watermark block is taken out of the frequency domain, a spatial mask of the original block is weighted to the watermark block, and added to the original block to obtain the watermarked block.

Pereira and Pun [4] proposed inserting a registration pattern in the watermarked image and trying to identify and invert the geometric distortion before watermark detection. As pointed out by Lin et al. [5], there are problems with this solution. One problem is that it may reduce image quality due to insertion of the registration pattern. Another problem is the possibility of a collusion attack, because all the watermarked images share a common registration pattern.

In Lin [5], a Fourier-Mellin transform was used to embed a watermark, which was cast in a rotation-, scale-, and translation-invariant domain. To solve the problem of instability in inverting a log-polar re-sampling of the Fourier magnitude, an iterative method was proposed to approximate this step. However, this approach is computationally complex, which makes it unsuitable for realtime applications.

Earlier, Solachidis and Pitas [6] proposed a circular symmetric watermarking scheme in the DFT domain where each watermark bit was embedded in a section of a circular ring in the frequency domain. In the case of rotation, a search for the rotated angle needed to be performed to detect the watermark.

Regardless of the merits of prior art methods, there is a need for an improved watermark for digital data that prevents copying, forgery and distribution of media content. The present invention satisfies this need. More specifically, the goal of the present invention is to provide unique, dynamic and robust digital watermarks for digital data, in order to trace any compromised copies of the digital data.

SUMMARY OF THE INVENTION

The present invention discloses a method and apparatus for embedding a watermark in digital data. A Y component of a Y, U(Cb), V(Cr) digital data stream representing color components of digital video is extracted as the digital data for embedding the watermark. The digital data is then scaled to a standard size. A Discrete Fourier Transform (DFT) is performed on the digital data, and a magnitude domain of the Discrete Fourier Transform is computed. The watermark is embedded into selected frequency bands of the computed magnitude domain of the Discrete Fourier Transform, thereby creating a watermarked magnitude domain. The selected frequency bands comprise one or more middle frequency bands, and the middle frequency bands comprise a band of circular rings of the magnitude domain. An inverse Discrete Fourier Transform is performed on the watermarked magnitude domain to reconstruct the digital data with the embedded watermark.

The present invention also discloses a method and apparatus for detecting a watermark in digital data. A Y component of a Y, U(Cb), V(Cr) digital data stream representing color components of digital video is extracted as the digital data for embedding the watermark. The digital data is then scaled to a standard size. A Discrete Fourier Transform (DFT) is performed on the digital data, and a magnitude domain of the Discrete Fourier Transform is computed. The watermark is detected and/or extracted from selected frequency bands of the computed magnitude domain of the Discrete Fourier Transform. The selected frequency bands comprise one or more middle frequency bands, and the middle frequency bands comprise a band of circular rings of the magnitude domain.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. Overview

The present invention comprises a novel watermarking embedding and detection apparatus and method for digital images/videos. A Y (luminance) component is extracted as digital data from a Y, U(Cb), V(Cr) digital data stream representing the color components of the digital images/video, the digital data is scaled to a standard size, a DFT (Discrete Fourier Transform) is performed on the standard size digital data, the magnitude domain of the DFT is computed, a watermark comprised of a pattern or vector of W bits is cast or embedded into selected frequency bands of the computed magnitude domain, thereby creating a watermarked magnitude domain, and then an inverse DFT is performed on the watermarked magnitude domain to reconstruct the digital data with the embedded watermark.

The watermark is robust, in that it survives a number of different attacks, such as compression, rotation, cropping, scaling, etc. Experiments show that the watermark can survive such attacks due to advantages in rotation and scaling invariance of the DFT.

The payload of the watermark is large enough that each watermark may be unique. Moreover, the watermark may be created dynamically, for example, according to the time and place of presentation, and thus is appropriate for realtime applications. Consequently, the watermark may operate as a unique label for the images/video, and thus protect the copyright of the images/video.

Detection of the watermark can be oblivious, which means that it does not require the original images/video, or semi-oblivious, which means that it only requires limited information from the original images/video.

2. Hardware Environment

Figure 1A:
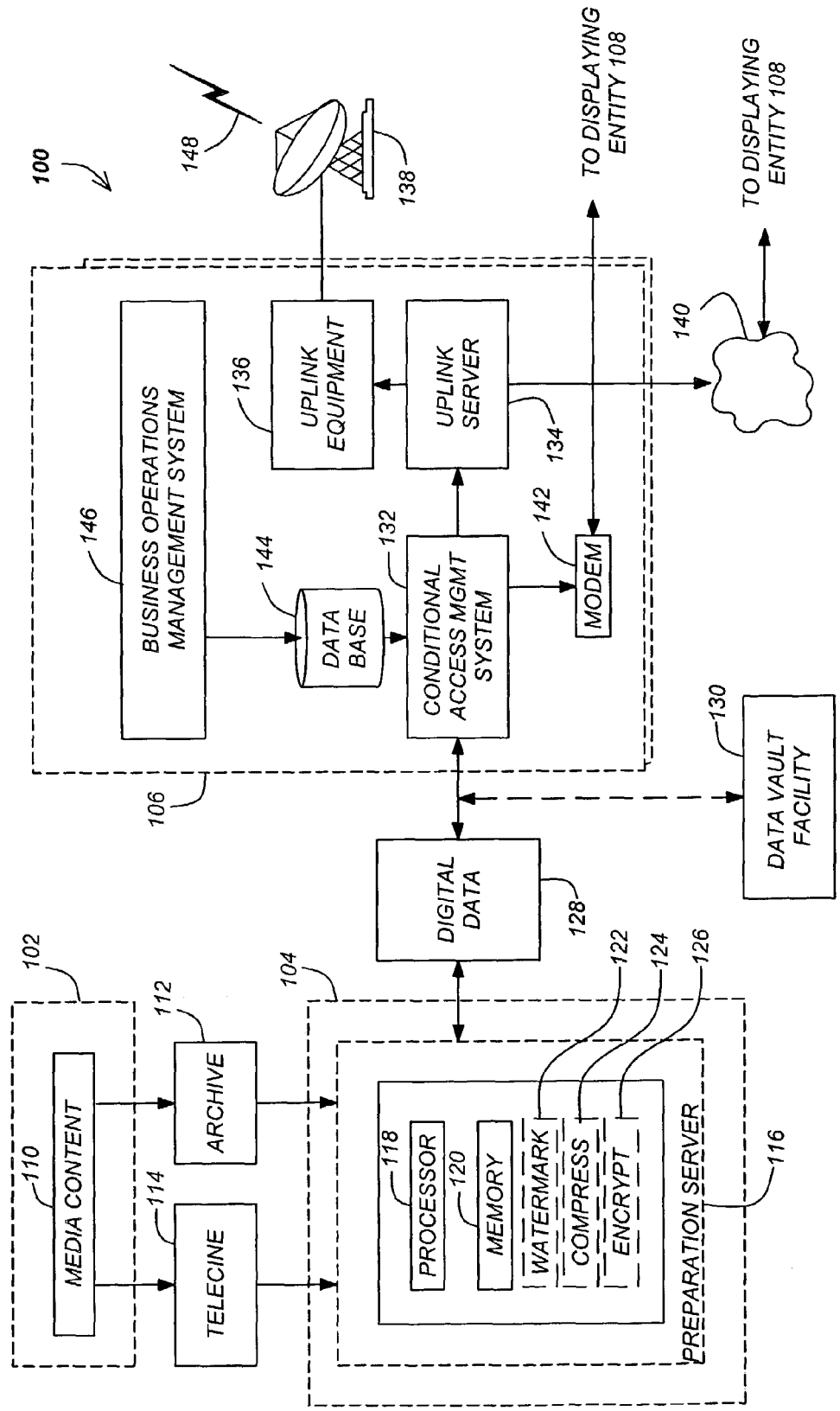
FIGS. 1A and 1B depict a top-level functional block diagram of one embodiment of a media content distribution system.
Figure 1B:
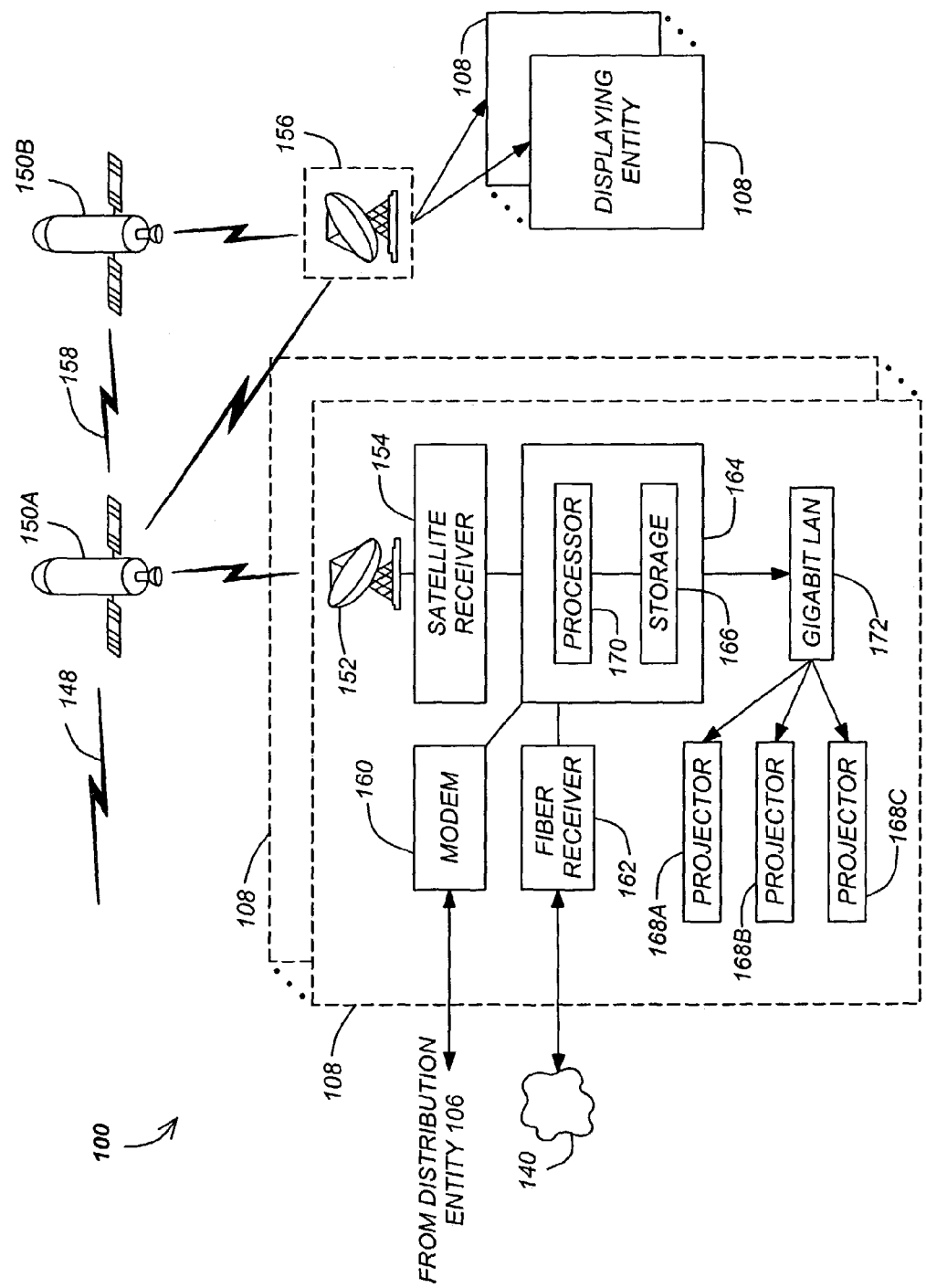

FIGS. 1A and 1B depict a top-level functional block diagram of one embodiment of a media content distribution system 100. The media content distribution system 100 comprises a content provider 102, a protection entity 104, a distribution entity 106 and one or more presentation/displaying entities 108. The content provider 102 provides media content 110 such as audiovisual material to the protection entity 104. The media content 110, which can be in digital or analog form, can be transmitted in electronic form via the Internet, by dedicated land line, broadcast, or by physical delivery of a physical embodiment of the media (e.g. a celluloid film strip, optical or magnetic disk/tape). Content can also be provided to the protection entity 104 from a secure archive facility 112.

The media content 110 maybe telecined by processor 114 to format the media content as desired. The telecine process can take place at the content provider 102, the protection entity 104, or a third party.

The protection entity 104 may include a media preparation processor 116. In one embodiment, the media preparation processor 116 includes a computer system such as a server, having a processor 118 and a memory 120 communicatively coupled thereto. The protection entity 104 further prepares the media content 110. Such preparation may include adding protection to the media content 110 to prevent piracy of the media content 110. For example, the preparation processor 116 can perform a watermarking process 122, apply a compression process 124, and/or perform an encrypting process 126 on the media content 110 to protect it, resulting in output digital data 128. Thus, the output digital data 128 may contain one or more data streams that has been watermarked, compressed and/or encrypted.

Once prepared, the output digital data 128 can be transferred to the distribution entity 106 via digital transmission, tape or disk (e.g., CD-ROM, DVD, etc.). Moreover, the output digital data 128 can also be archived in a data vault facility 130 until it is needed.

Although illustrated as separate entities, the protection entity 104 can be considered as part of the distribution entity 106 in the preferred embodiment and is communicatively positioned between the content provider 102 and the distribution entity 106. This configuration ameliorates some of the security concerns regarding the transmission of the output digital data 128 between the protection entity 104 and the distribution entity 106. In alternative embodiments, however, the protection entity 104 could be part of the content provider 102 or displaying entity 108. Moreover, in alternative embodiments, the protection entity 104 could be positioned between the distribution entity 106 and the displaying entity 108. Indeed, it should be understood that the protection entity 104, and the functions that it performs, may be employed whenever and wherever the media content 110 moves from one domain of control to another (for example, from the copyright holder to the content provider 102, from the content provider 102 to the distribution entity 106, or from the distribution entity 106 to the display entity 108).

The distribution entity 106 includes a conditional access management system (CAMS) 132, that accepts the output digital data 128, and determines whether access permissions are appropriate for the output digital data 128. Further, CAMS 132 may be responsible for additional encrypting so that unauthorized access during transmission is prevented.

Once the output digital data 128 is in the appropriate format and access permissions have been validated, CAMS 132 provides the output digital data 128 to an uplink server 134, ultimately for transmission by uplink equipment 136 to one or more displaying entities 108, as shown in FIG. 1B. This is accomplished by the uplink equipment 136 and uplink antenna 138.

In addition or in the alternative to transmission via satellite, the output digital data 128 can be provided to the displaying entity 108 via a forward channel fiber network 140. Additionally, the output digital data 128 may be transmitted to displaying entity 108 via a modem 142 using, for example a public switched telephone network line. A land based communication such as through fiber network 140 or modem 142 is referred to as a back channel. Thus, information can be transmitted to and from the displaying entity 108 via the back channel or the satellite network. Typically, the back channel provides data communication for administration functions (e.g. keys, billing, authorization, usage tracking, etc.), while the satellite network provides for transfer of the output digital data 128 to the displaying entities 108.

The output digital data 128 may be securely stored in a database 144. Data is transferred to and from the database 144 under the control and management of the business operations management system (BOMS) 146. Thus, the BOMS 146 manages the transmission of information to 108, and assures that unauthorized transmissions do not take place.

Referring to FIG. 1B, the data transmitted via uplink 148 is received in a satellite 150A, and transmitted to a downlink antenna 152, which is communicatively coupled to a satellite or downlink receiver 154.

In one embodiment, the satellite 150A also transmits the data to an alternate distribution entity 156 and/or to another satellite 150B via crosslink 158. Typically, satellite 150B services a different terrestrial region than satellite 150A, and transmits data to displaying entities 108 in other geographical locations.

A typical displaying entity 108 comprises a modem 160 (and may also include a fiber receiver 158) for receiving and transmitting information through the back channel (i.e., via an communication path other than that provided by the satellite system described above) to and from the distribution entity 106. For example, feedback information (e.g. relating to system diagnostics, keys, billing, usage and other administrative functions) from the exhibitor 108 can be transmitted through the back channel to the distribution entity 106. The output digital data 128 and other information may be accepted into a processing system 164 (also referred to as a content server). The output digital data 128 may then be stored in the storage device 166 for later transmission to displaying systems (e.g., digital projectors) 168A-168C. Before storage, the output digital data 128 can be decrypted to remove transmission encryption (e.g. any encryption applied by the CAMS 132), leaving the encryption applied by the preparation processor 116.

When the media content 110 is to be displayed, final decryption techniques are used on the output digital data 128 to substantially reproduce the original media content 110 in a viewable form which is provided to one or more of the displaying systems 168A-168C. For example, encryption 126 and compression 124 applied by the preparation processor 118 is finally removed, however, any latent modification, undetectable to viewers (e.g., the results from the watermarking process 122) is left intact. In one or more embodiments, a display processor 170 prevents storage of the decrypted media content 110 in any media, whether in the storage device 166 or otherwise. In addition, the media content 110 can be communicated to the displaying systems 168A-168C over an independently encrypted connection, such as on a gigabit LAN 172.

Generally, each of the components of the system 100 comprise hardware and/or software that is embodied in or retrievable from a device, medium, signal or carrier. Moreover, this hardware and/or software perform the steps necessary to implement and/or use the present invention. Thus, the present invention may be implemented as a method, apparatus, or article of manufacture.

Of course, those skilled in the art will recognize that many modifications may be made to the configuration described without departing from the scope of the present invention. Specifically, those skilled in the art will recognize that any combination of the above components, or any number of different components, may be used to implement the present invention, so long as similar functions are performed thereby.

2. Watermarking Process

In the preferred embodiment, a DFT is performed on size-standardized digital data comprising a Y (luminance) component extracted from a Y, U(Cb), V(Cr) digital data stream representing the color components of the digital images/video. Then, the magnitude domain of the DFT is computed. A watermark comprised of a vector of W bits is cast or embedded in selected frequency bands of the computed magnitude domain, thereby creating a watermarked magnitude domain. Finally, an inverse DFT is performed on the watermarked magnitude domain to reconstruct the digital data with the embedded watermark.

In a preferred embodiment, the present invention is used for secure digital movie distribution systems, such as described in U.S. Utility patent application Ser. No. 10/131,104, filed on Apr. 24, 2002, by Troy Dean Rockwood, Bong Kyun Ryu, Wensheng Zhou and Yongguang Zhang, entitled SYSTEM AND METHODS FOR DIGITAL CONTENT DISTRIBUTION, which application is incorporated by reference herein.

The preferred embodiment of the present invention also complements the general concept of dynamic feature-based watermarks described in U.S. Utility patent application Ser. No. 10/419,495, filed on Apr. 21, 2003, by Wensheng Zhou and Phoom Sagetong, entitled DYNAMIC WAVELET FEATURE-BASED WATERMARK, which application claims the benefit under 35 U.S.C. §119(e) of co-pending and commonly-assigned U.S. Provisional Patent Application Ser. No. 60/376,092, filed Apr. 29, 2002, by Wensheng Zhou and Phoom Sagetong, entitled DYNAMIC WAVELET FEATURE-BASED WATERMARK APPARATUS AND METHOD FOR DIGITAL MOVIES IN DIGITAL CINEMA, which application is incorporated by reference herein.

In addition, the preferred embodiment of the present invention complements the general concept of non-repudiation watermarking described in U.S. Utility patent application Ser. No. 10/419,489, filed on Apr. 21, 2003, by Troy Rockwood and Wensheng Zhou, entitled NON-REPUDIATION WATERMARKING PROTECTION BASED ON PUBLIC AND PRIVATE KEYS, which application claims the benefit under 35 U.S.C. §119(e) of co-pending and commonly-assigned U.S. Provisional Patent Application Ser. No. 60/376,212, filed Apr. 29, 2002, by Troy Rockwood and Wensheng Zhou, entitled NON-REPUDIATION WATERMARKING PROTECTION APPARATUS AND METHOD BASED ON PUBLIC AND PRIVATE KEY, which application is incorporated by reference herein.

2.1. Discrete Fourier Transform

In the present invention, the DFT of an $N_1 \times N_2$ image $i(n_1, n_2)$ is computed as:

$$F(k_1, k_2) = \sum_{n_1=0}^{N_1-1} \sum_{n_2=0}^{N_2-1} i(n_1, n_2) \exp^{-j2\pi n_1 k_1/N_1 - j2\pi n_2 k_2/N_2} \tag{1}$$

where:
$N_1$ is the number of pixels on a first axis of the image,
$N_2$ is the number of pixels on a second axis of the image,
i is an image buffer of two dimensions,
$n_1$ is an index to a first dimension of the image buffer,
$n_2$ is an index to a second dimension of the image buffer,
F is a Fourier transform,
$k_1$ is a continuous function of a first variable along the first axis,
$k_2$ is a continuous function of a first variable along the second axis, and
j is the square root of −1.

Translation in the spatial domain will have no effect on the magnitude of a Fourier transform as shown in Equation 2. Instead, it only causes a phase shift.

$$|DFT(i(n_1+t_1, n_2+t_2))| = |DFT(i(n_1, n_2))| \tag{2}$$

where:
$t_1$ is a first time sequence,
$t_2$ is a second time sequence, and
DFT is a Discrete Fourier Transform.

When the image $i(n_1, n_2)$ is rotated a degrees in the spatial domain, it will cause the same rotation in the frequency domain:

$$DFT(i(n_1 \cos a - n_2 \sin a, n_1 \sin a + n_2 \cos a)) = F(i(k_1 \cos a - k_2 \sin a, k_1 \sin a + k_2 \cos a)) \tag{3}$$

If it is assumed that a fixed-size DFT is performed on the original and scaled images, then scaling in the spatial domain causes inverse scaling in the Fourier domain, as shown in Equation 4. If an image is down-sampled, an alias effect will occur in the high frequency bands.

$$DFT(i(\sigma n_1, \sigma n_2)) = \frac{1}{\sigma} F\left(\frac{k_1}{\sigma}, \frac{k_2}{\sigma}\right) \tag{4}$$

where:
σ is a scaling factor.

In order to cope with this problem, some pre-processing needs to be performed before applying the Fourier transform to the image. The image is first scaled to a standard size (512×512, for example), then a FFT (Fast Fourier Transform) of the same size is performed on the resulting image. The same pre-processing is used by the watermark detection algorithm.

Figure 2A:
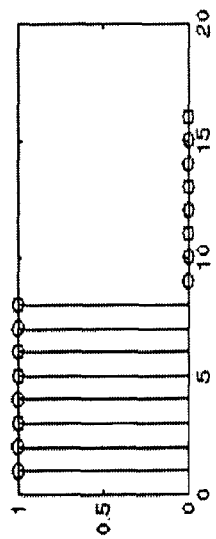
FIGS. 2A-2F, which illustrate the relationship of DFT coefficients of an original signal, down-sampled signal, and the down-sampled signal after being up-sampled.
Figure 2B:
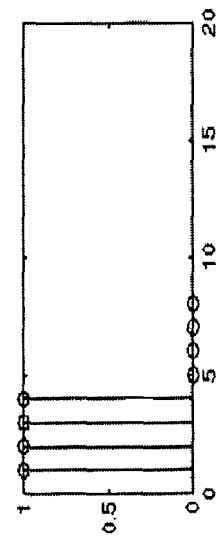
Figure 2C:
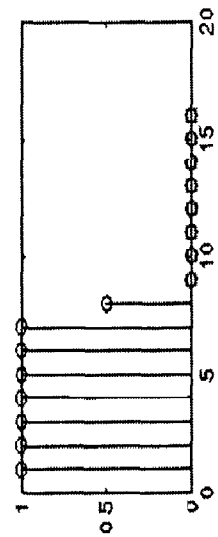
Figure 2D:
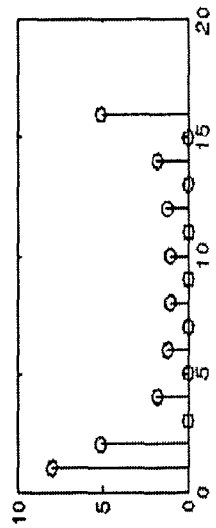
Figure 2E:
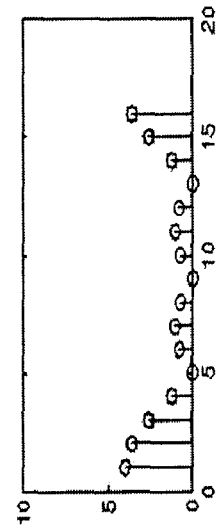
Figure 2F:
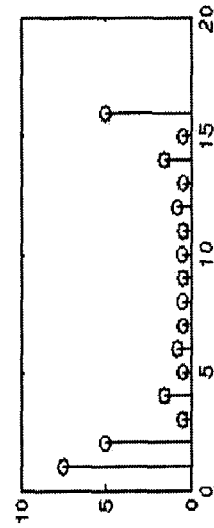

The benefit of doing this can be clarified by a simplified example in FIGS. 2A-2F, which illustrate the relationship of DFT coefficients of an original signal, down-sampled signal, and the down-sampled signal after being up-sampled. FIG. 2A is an original 16-point signal, FIG. 2B is the original signal of FIG. 2A down-sampled by 2, and FIG. 2C is the down-sampled signal of FIG. 2B up-sampled by 2. FIGS. 2D, 2E, and 2F are the 16-point Fourier Transform coefficients of the original signal of FIG. 2A, the down-sampled signal of FIG. 2B, and the up-sampled signal of FIG. 2C, respectively. Note that the Fourier Transform of the down-sampled signal shown in FIG. 2E is a scaled and aliased version of the Fourier Transform of the original signal shown in FIG. 2D. Then, the re-scaled (up-sampled) signal is obtained by interpolating the down-sampled signal and FIG. 2F shows its 16-point Fourier transform coefficients. In FIG. 2F, it can be seen that, after re-scaling the down-sampled signal back to its original size by interpolation, the Fourier transform coefficients closely represent the original ones in FIG. 2D.

2.2. Watermark Embedding

Figure 3:
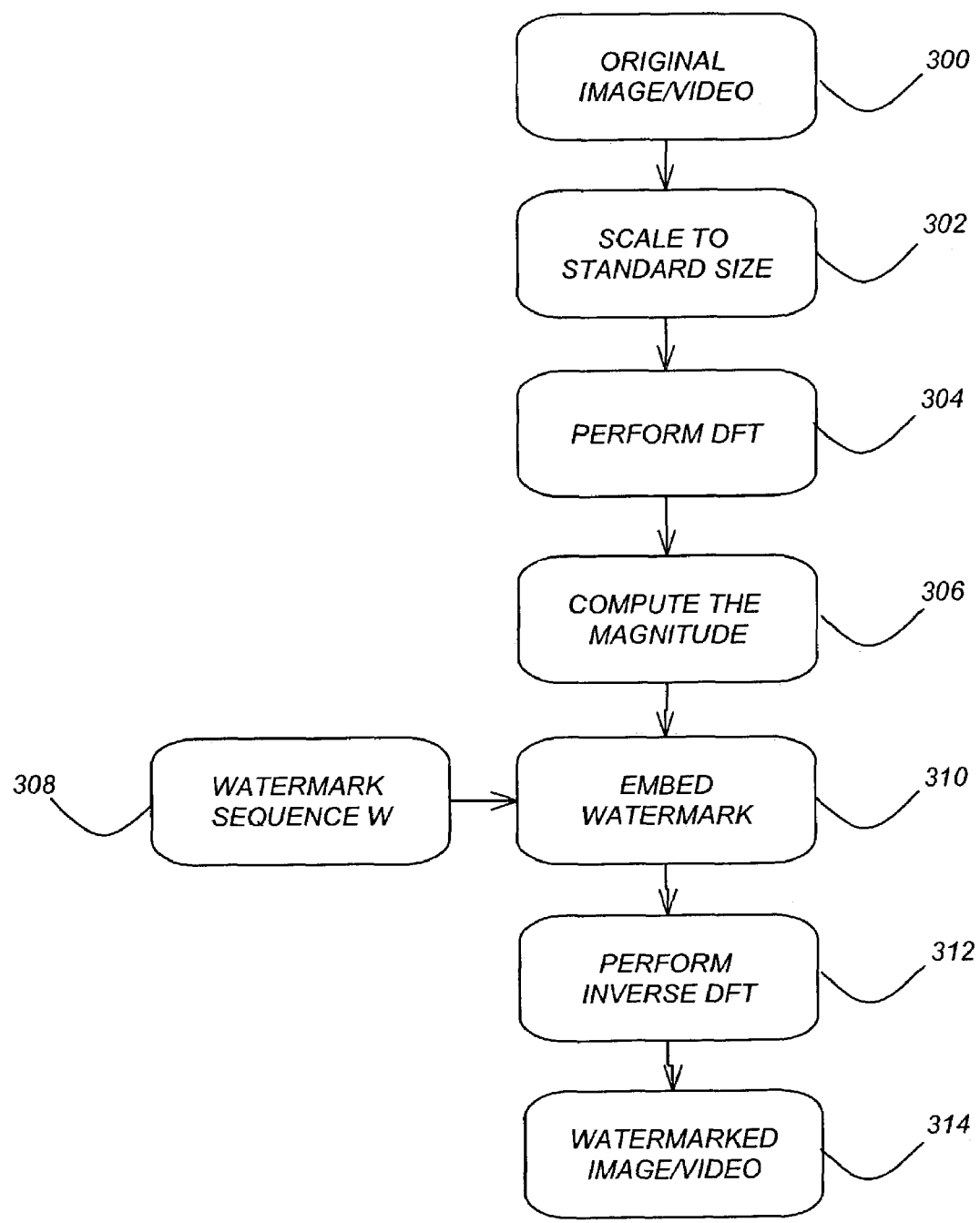
FIG. 3 is a flow chart that illustrates the logic of the watermarking embedding algorithm according to a preferred embodiment of the present invention.

FIG. 3 is a flow chart that illustrates the logic of the watermarking embedding algorithm according to a preferred embodiment of the present invention. In the preferred embodiment, this logic is performed by the watermarking process 122, but it may be performed by other entities in alternative embodiments.

Block 300 represents the watermarking process 122 receiving and initially processing the original images/video, e.g., an MPEG video stream. In this Block, the images/video may first decoded using an MPEG decoder and then the Y (luminance) component of a Y, U(Cb), Y(Cr) digital data stream representing the color components of the digital images/video may be extracted. This extracted Y component comprises the digital data processed by the remaining steps of the logic.

Block 302 represents the watermarking process 122 scaling the digital data to a standard size.

Block 304 represents the watermarking process 122 performing a DFT on the size-standardized digital data.

Block 306 represents the watermarking process 122 computing the magnitude domain of the DFT.

Block 308 represents the watermarking process 122 obtaining a watermark comprised of a pattern or vector of W bits.

Block 310 rep resents the watermarking process 122 casting or embedding the watermark into selected frequency bands of the magnitude domain of the DFT, thereby creating a watermarked magnitude domain.

Block 312 represents the watermarking process 122 performing an inverse DFT on the watermarked magnitude domain to reconstruct the digital data with the embedded watermark.

Block 314 represents the watermarking process 122 outputting a watermarked version of the images/video. In this Block, the digital data, which comprises the Y (luminance) component of a Y, U(Cb), V(Cr) digital data stream representing the color components of the digital images/video, is reinserted into the Y, U(Cb), V(Cr) digital data stream, resulting in the watermarked version of the digital images/video.

2.3 Embedding the Watermark

In Block 310, the selected frequency bands are middle frequency bands, wherein the middle frequency bands comprise a band of circular rings of the magnitude domain of the DFT. The width and location of the bands are empirically chosen, and they are also chosen based on the watermark payload (how many bits need to be embedded into each image) and the content of the image.

Specifically, a high frequency band renders the watermark vulnerable to image processing operations, such as low-pass filtering and compression. A low frequency band renders the watermark visible in the images/video. Consequently, the selected frequency bands comprise middle frequency bands, in the preferred embodiment.

The watermark is a vector $W=\{w_1, w_2, \ldots, w_k\}$ of k bits, which has the same number of 1s and −1s in order to obtain a zero mean. Each bit $w_i$ is embedded into a band of circular rings $B_i=\{M(k_1,k_2), R_{i,l} \leq \sqrt{k_1^2+k_2^2} \leq R_{i,h}\}$, where $R_{i,l}$ and $R_{i,h}$ are, respectively, the inner and outer boundaries of the band $B_i$ and $M(k_1,k_2)$ are the magnitude coefficients.

Let $e_i$ be the feature element in the i th band:

$$e_i = \sum_{(k_1,k_2) \in B_i} M(k_1, k_2) \tag{5}$$

wherein:

a feature vector $E=\{e_1, e_2, \ldots, e_k\}$ is comprised of $l_1$ norms of each band.

A multiplicative embedding function is used, since it is signal adaptive. When watermark bit $w_i$ is inserted into the i th band, the modified feature $e'_i$ is:

$$e'_i = e_i(1+\lambda w_i) \tag{6}$$

where $\lambda$ is the embedding strength. It can be seen that the present invention could simply modify each coefficient $M(k_1,k_2) \in B_i$ accordingly:

$$M'(k_1,k_2) = M(k_1,k_2)(1+\lambda w_i) \tag{7}$$

Now, with the modified magnitude coefficients M' and phase P unchanged, the inverse DFT (IDFT) is performed to obtain the watermarked image $i'(n_1,n_2)$:

$$i' = IDFT(M',P) \tag{8}$$

2.4 Watermark Detection

Figure 4:
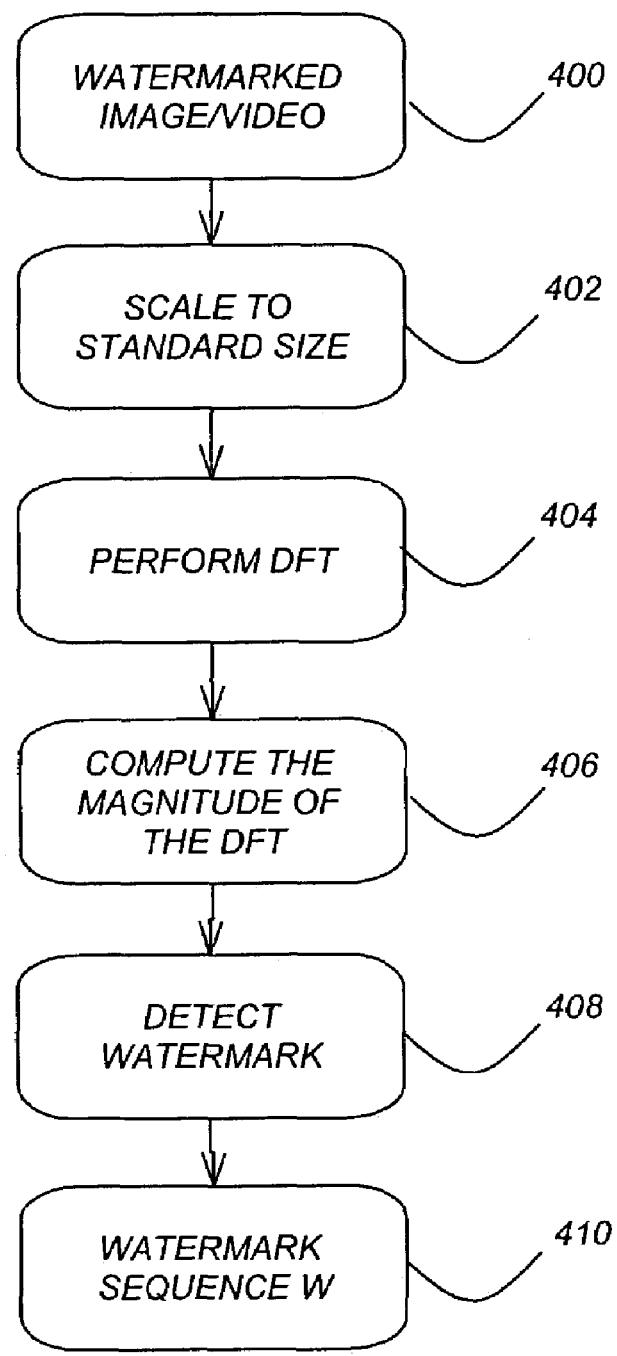
FIG. 4 is a flow chart of the watermark detection algorithm according to a preferred embodiment of the present invention.

FIG. 4 is a flow chart of the watermark detection algorithm according to a preferred embodiment of the present invention. In the preferred embodiment, this logic is performed by the content provider 102, but it may be performed by other entities in alternative embodiments.

Block 400 represents the content provider 102 receiving and initially processing the watermarked images/video, denoted as $i'(n_1,n_2)$. In this Block, the watermarked images/video may first be decoded using an MPEG decoder and then the Y (luminance) component of a Y, U(Cb), V(Cr) digital data stream representing the color components of the digital images/video may be extracted. This extracted Y component comprises the digital data processed by the remaining steps of the logic.

Block 402 represents the content provider 102 scaling the digital data to a standard size.

Block 404 represents the content provider 102 performing a DFT on the size-standardized digital data.

Block 406 represents the content provider 102 computing a magnitude domain of the DFT.

Block 408 represents the content provider 102 detecting and/or extracting the watermark from selected frequency bands of the computed magnitude domain of the DFT. As with FIG. 3 above, the selected frequency bands comprise one or more middle frequency bands, wherein the middle frequency bands comprise a band of circular rings of the magnitude domain.

Block 410 represents the content provider 102 outputting the detected watermark as a vector W.

2.5 Detecting and/or Extracting the Watermark

In Block 408 using the same set of bands of rings $\{B_i\}$ as were used in embedding the watermark, the feature element $e_i$ of each band is computed. According to Equation 6, each bit $w_i^d$ of the watermark vector W can be extracted as:

$$w_i^d = \frac{e'_i - e_i}{\lambda e_i} \tag{9}$$

where:

d denotes that the watermark bit $w_i^d$ is extracted from a distorted image and is different from the original embedded watermark bit $w_i$.

The image distortion is introduced due to either general signal processing or intentional attacks. A simple post-processing can be added, as in [3], to the watermark extraction to improve the correlation detection performance:

$$w^*_i = w_i^d - \text{mean}(w^d) \qquad (10)$$

where:

$w^*_i$ is the extracted watermark bit, and $\text{mean}(w^d)$ denotes the mean value of the extracted watermark bits.

In Block 408, a correlation-based detector is employed to decide whether a certain watermark signal is present in the image or not. The correlation between the extracted watermark signal and the original watermark signal is computed as:

$$C = \frac{W^* \cdot W}{|W^*| \cdot |W|} \qquad (11)$$

where:

W* is the extracted watermark vector and

W is the original embedded watermark vector.

Then, the presence of a watermark signal is determined by performing a hypothesis test using a threshold T:

$H_0$: Watermark is present if C>T $H_1$: Watermark is not present otherwise

The choice of threshold T is a typical estimation problem and will affect the detection rate and false alarms of the system. In one experiment, it was set to 0.5 for simplicity. And, in the scenario of copyright tracking for digital cinema, there is a need to trace the origin of the illegal copies. Peak correlation detection could also be used to determine from which theater and at what time the copy was generated.

3. Experimental Results and Discussion

A series of experiments were performed on a 512×512 "Lena" image to test the robustness of the proposed watermarking algorithm to geometric attacks. The algorithm has also been implemented in C for MPEG-2 video sequences and embedded into the MPEG-2 decoder.

For video sequences, the watermark is cast into the luminance component of each frame. A 16-bit watermark {-1,1,1,1,-1,-1,1,1,1,-1,1,-1,-1,-1,-1,1} was used for all experiments. A set of 1024 watermarked sequences that are orthogonal to the given watermark are generated to represent different theater identifications. During watermark detection, the peak correlation of the extracted signal with one of the watermarked sequences is found to decide which watermark is actually present in the image. Images are scaled to a standard size 512×512 and 512-point FFT is performed. Finally, the experiments were categorized into multiple subsections based on the reducing visual quality and robustness against various attacks.

3.1. Perceptual Quality

Figure 5:
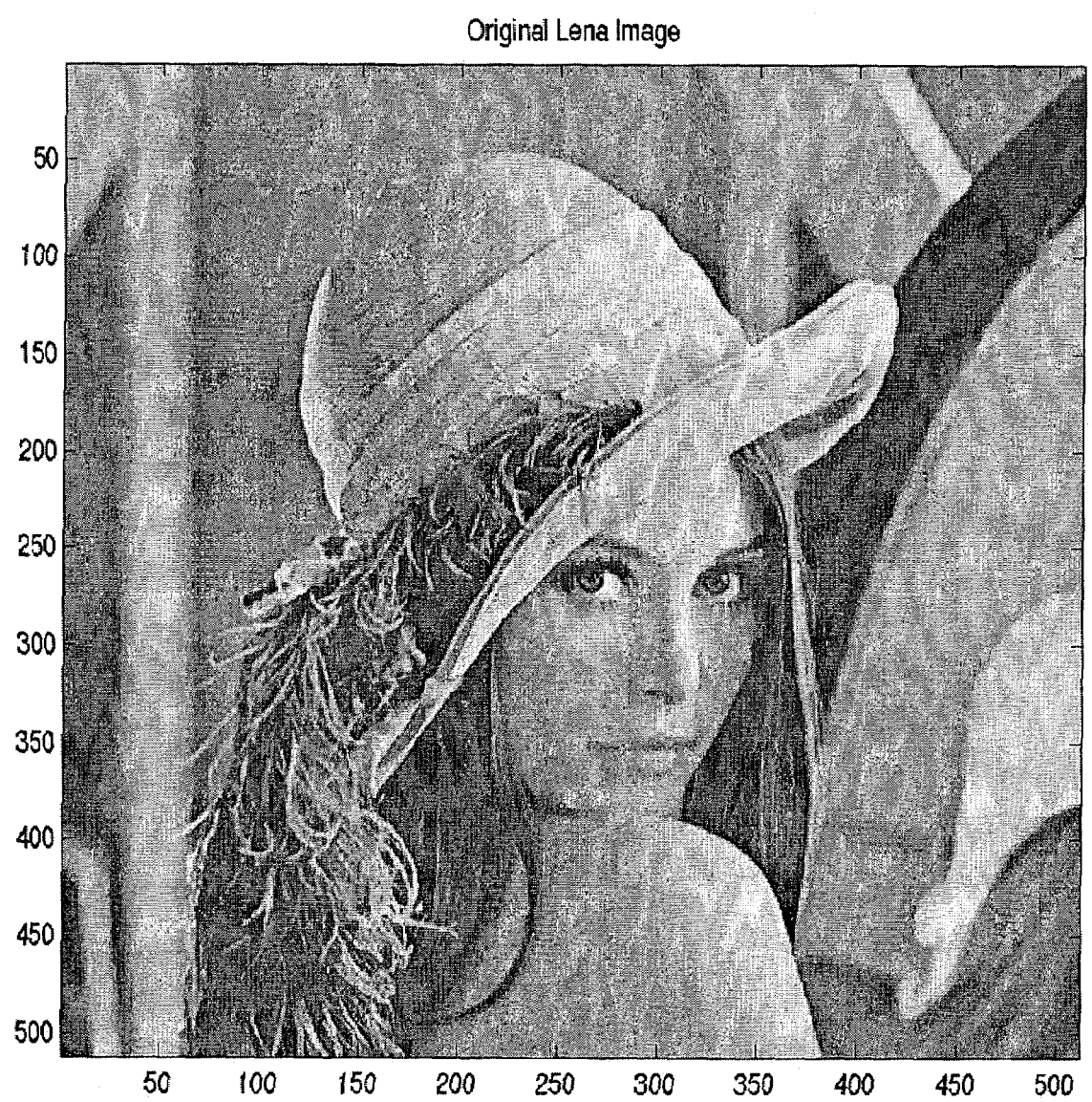
FIG. 5 show the original unwatermarked Lena image.
Figure 6:
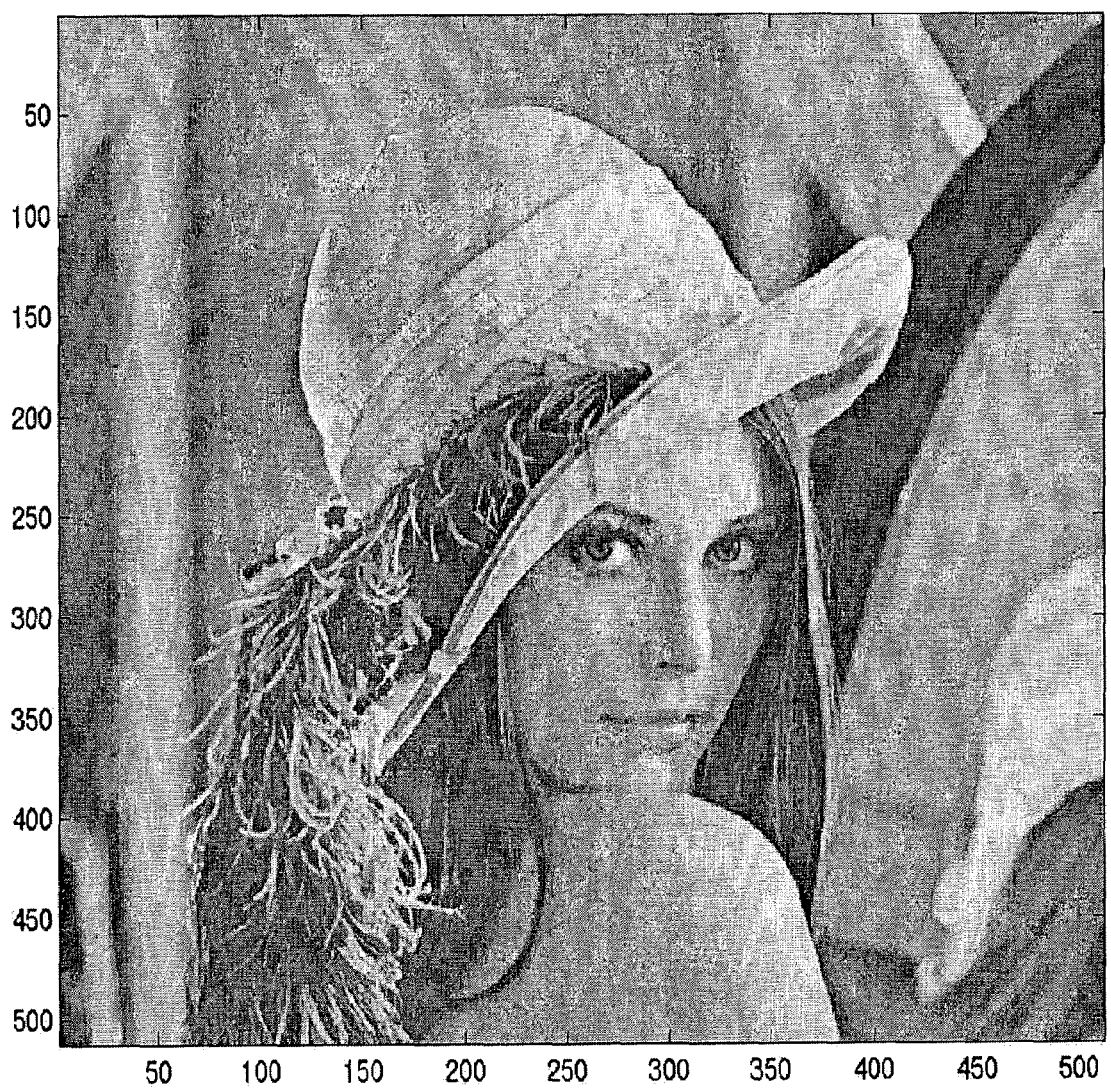
FIG. 6 shows the watermarked Lena image.

FIG. 5 show the original unwatermarked Lena image and FIG. 6 shows the watermarked Lena image. In this case, the embedding strength was set to λ=0.1, and $R_{1,l}$=28,$R_{1,h}$=32, $R_{16,h}$=107. Each band has width 5 and all bands are continually located.

Figure 7A:
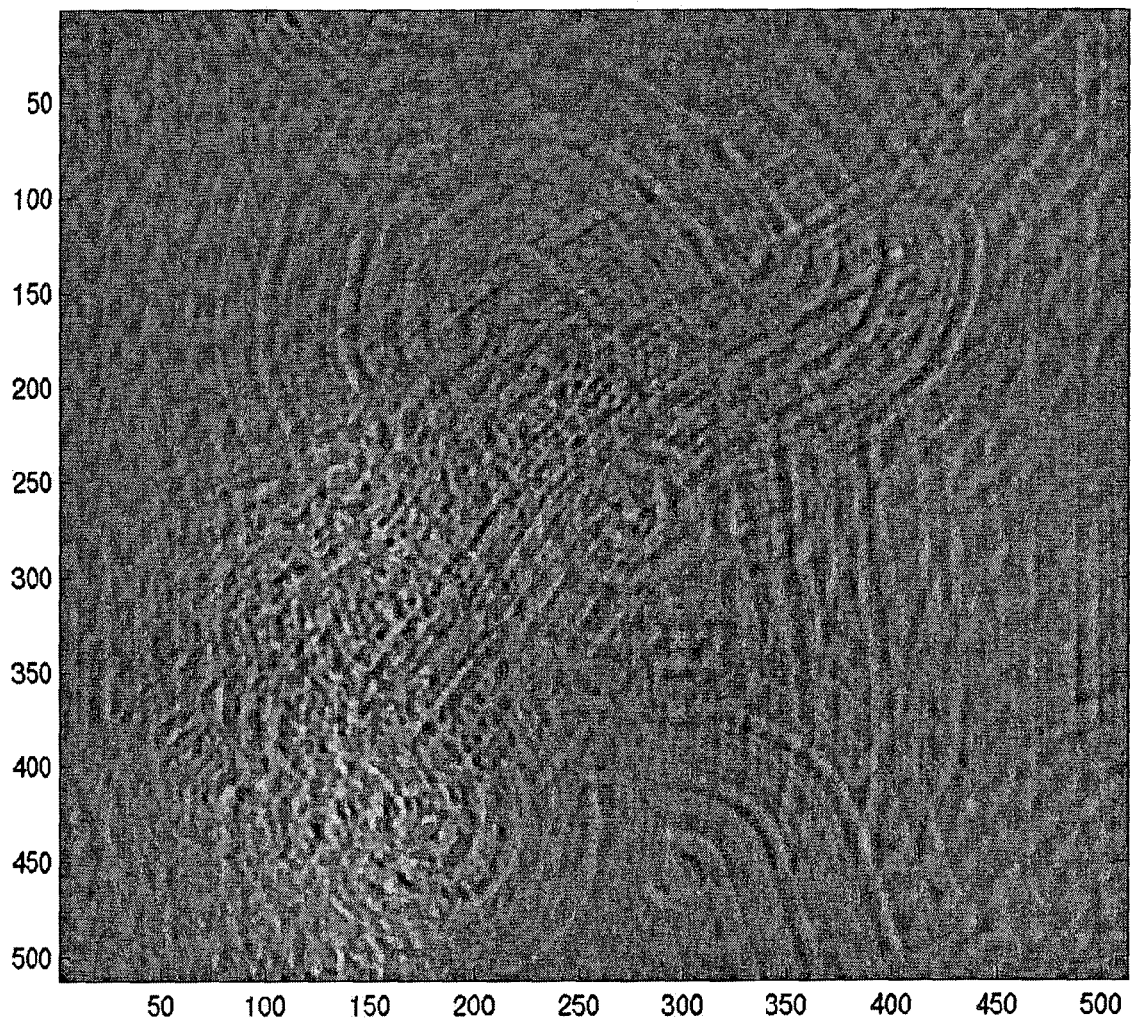
FIG. 7A shows the difference between the original image and the watermarked image.
Figure 7B:
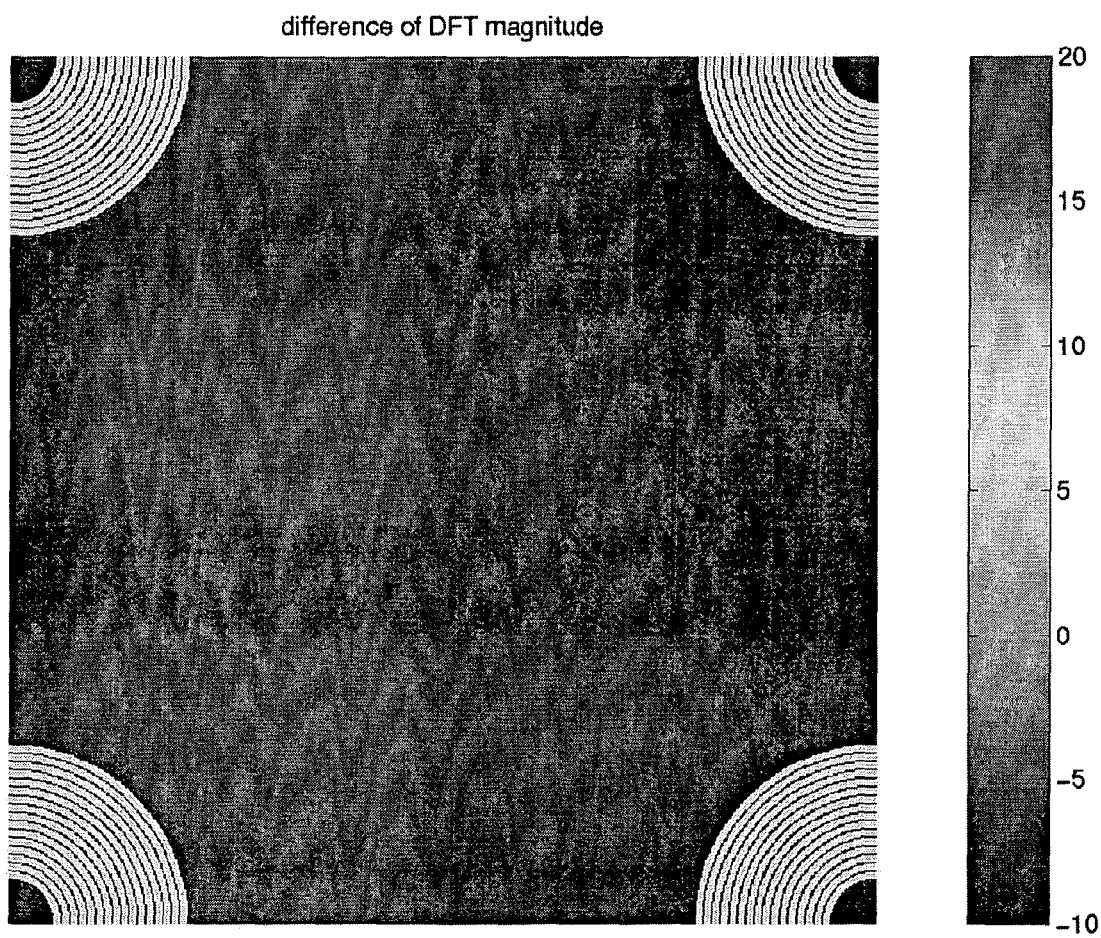
FIG. 7B shows the difference of the DFT magnitude between the original image and the watermarked image.
Figure 8:
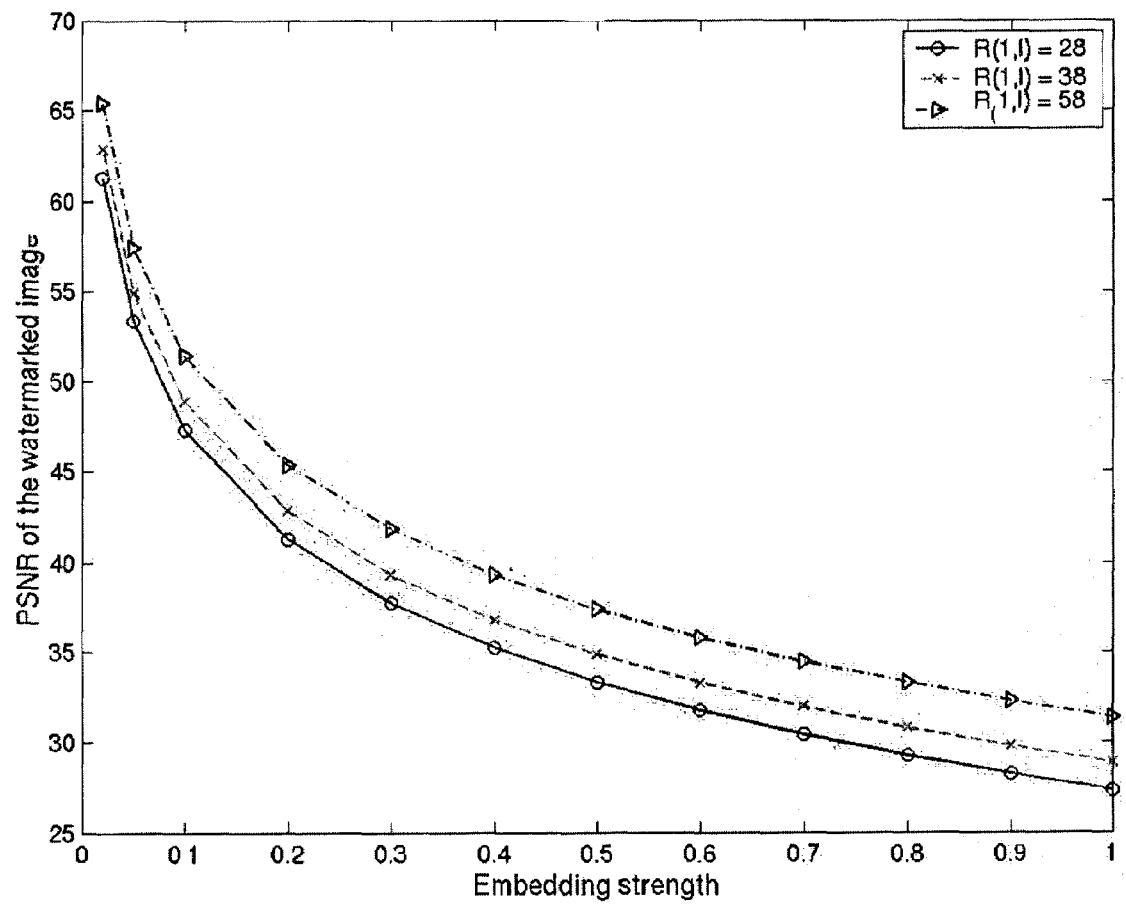
FIG. 8 shows the results of the computing the PSNR; (Peak Signal to Noise Ratio) of the watermarked image as a function of embedding strength $\lambda$ and the embedding bands $\{B_i\}$.

It can be seen that the watermark is invisible. The difference between the original image and the watermarked image is shown in FIG. 7A; and the difference of the DFT magnitude between the original image and the watermarked image is shown in FIG. 7B. Note that the difference value has been multiplied by a factor of 10 for clearer illustration. FIG. 8 shows the results of the computing the PSNR (Peak Signal to Noise Ratio) of the watermarked image as a function of embedding strength λ and the embedding bands $\{B_i\}$. It can be seen that as the embedding bands are moved towards a higher frequency, the PSNR performance improves. In real applications, there is a tradeoff between the quality of the watermarked image and the robustness of the watermark.

3.2. Scaling

Figure 9:
FIG. 9 shows the resealed Lena image of the image down-scaled by a factor 0.4375.
Figure 10:
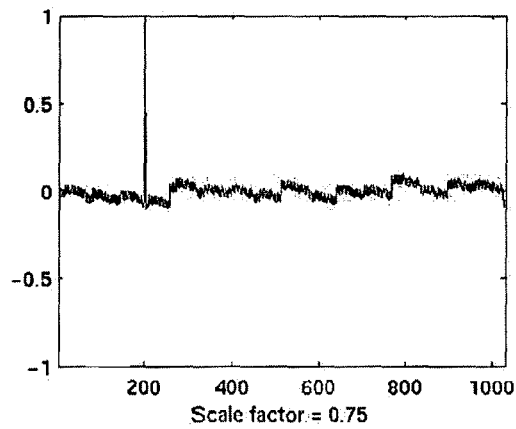
FIG. 10 shows the results of the correlation detection for scaling factors of 0.75, 0.5, 0.4375 and 0.3125.
Figure 10:
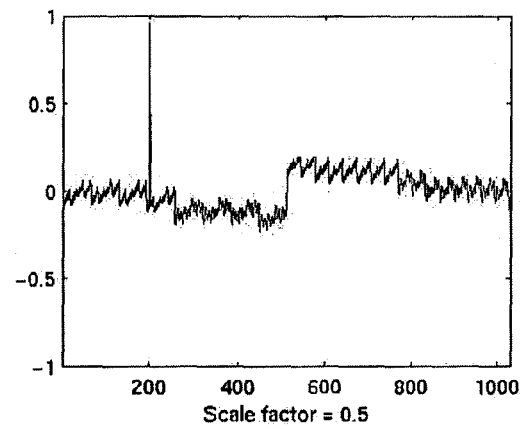
Figure 10:
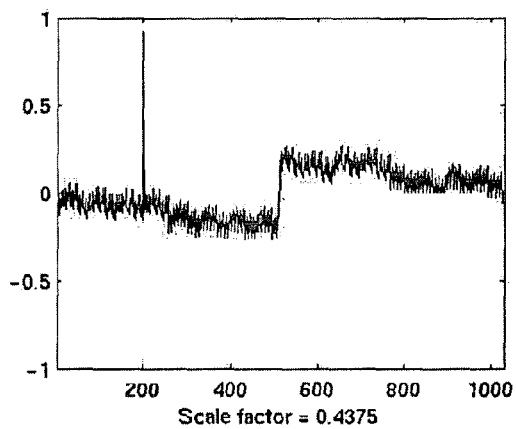
Figure 10:
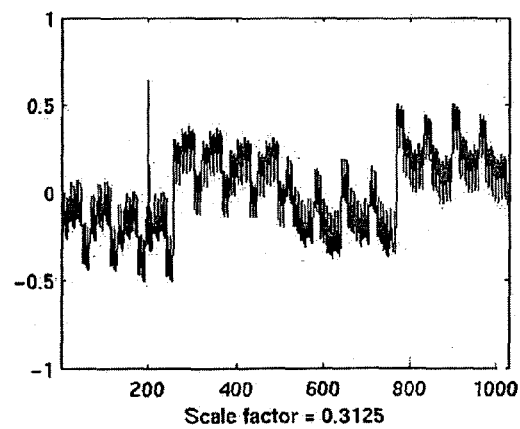

The watermarked image was scaled to different fractions of its original size, in order to demonstrate that the watermark detection works for scale factors down to 0.3125. In this case, where the scaled image area is only about 10 percent of the original image area, the correlation of the detected watermark signal and the right watermark signal is still well above any correlation with the others. FIG. 9 shows the rescaled Lena image of the image down-scaled by a factor 0.4375. It can be seen that a lot of the detail of the original image has been lost due to the down-scaling. The results of the correlation detection are shown in FIG. 10 for scaling factors of 0.75, 0.5, 0.4375 and 0.3125.

3.3. Rotation

Figure 11:
FIG. 11 shows the image rotated counter-clockwise by 30°.
Figure 12:
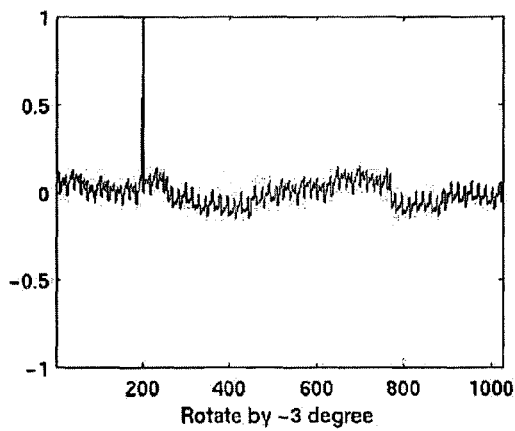
FIG. 12 shows the results of correlation detection for a set of images rotated by angles −3°, 5°, 30° and 45°.
Figure 12:
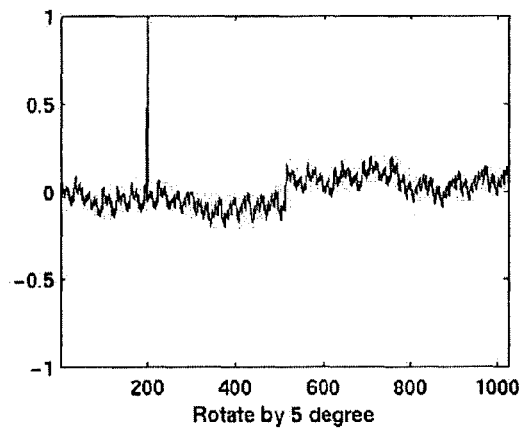
Figure 12:
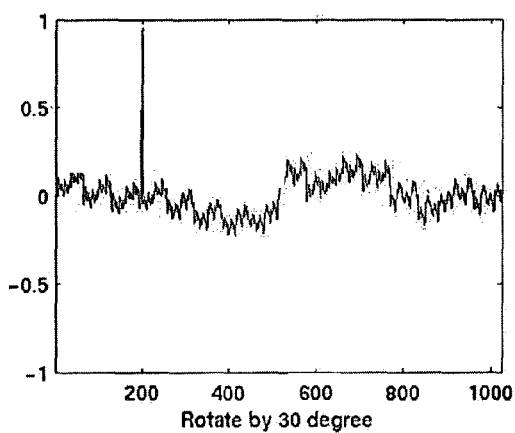
Figure 12:
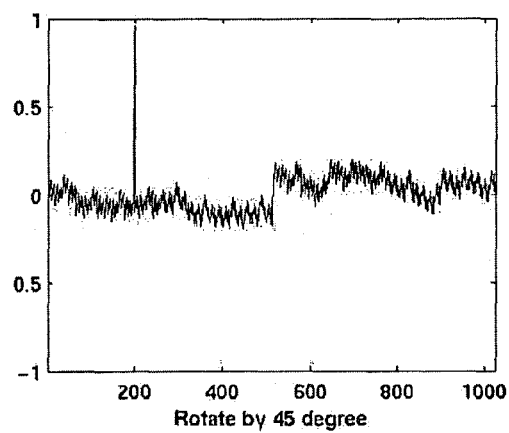

The image was also rotated by a set of angles. Since the watermark detection is based on a global feature in a circular band of rings, there was no need to search for possible rotated angles. FIG. 11 shows the image rotated counter-clockwise by 30°. FIG. 12 shows the results of correlation detection for a set of images rotated by angles −3°, 5°, 30° and 45°. From the results, it can be seen that the algorithm is very effective for image rotations.

3.4. Cropping

Figure 13:
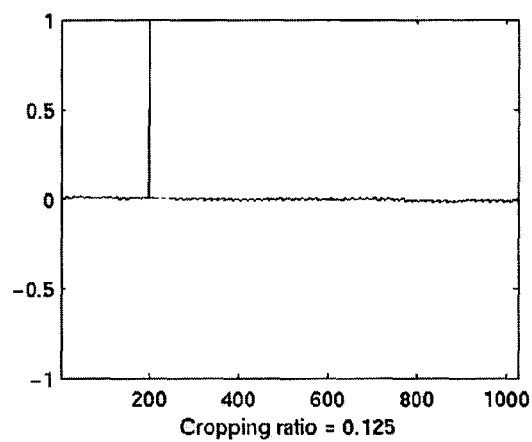
FIG. 13 shows the correlation detection responses of cropped images with cropping ratios (in both dimensions) of 0.125, 0.5, 0.7812 and 0.9453.
Figure 13:
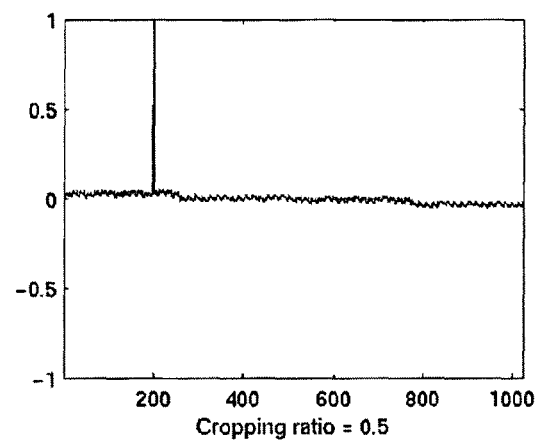
Figure 13:
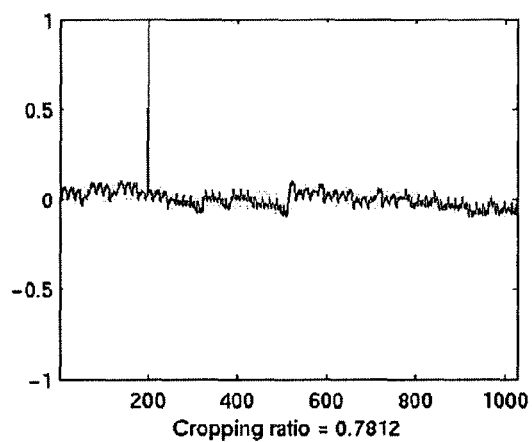
Figure 13:
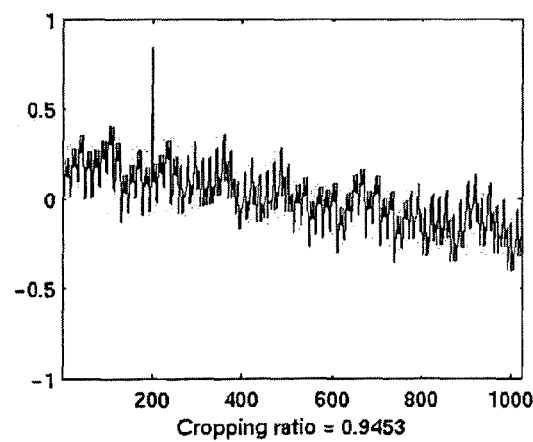

The watermarked image were cropped in both dimensions, with only the central part of the image left. The cropped part of the image was replaced by the corresponding part of the original unwatermarked image. FIG. 13 shows the correlation detection responses of cropped images with cropping ratios (in both dimensions) of 0.125, 0.5, 0.7812 and 0.9453. It can be seen that the correlation with the right watermark is well above the correlation with the others even when the cropping ratio is increased up to 0.7812. However, when the major part of the image is cropped, the response gets fuzzy.

3.5. Compression

Figure 14:
FIG. 14 shows the compressed Lena image with quality 7%.
Figure 15:
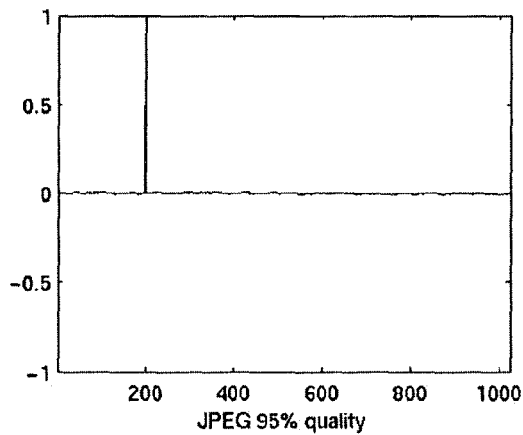
FIG. 15 show the correlation detector responses of JPEG compressed images with compression quality parameters of 95%, 50%, 20% and 7%.
Figure 15:
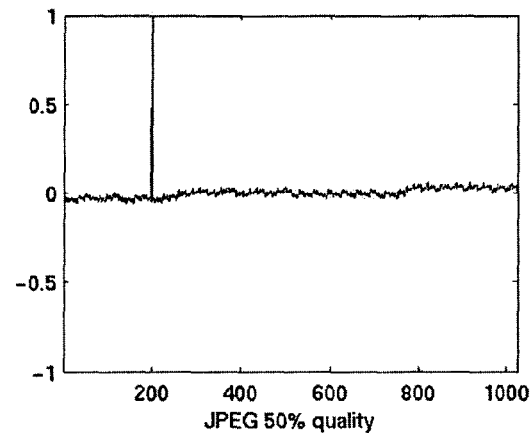
Figure 15:
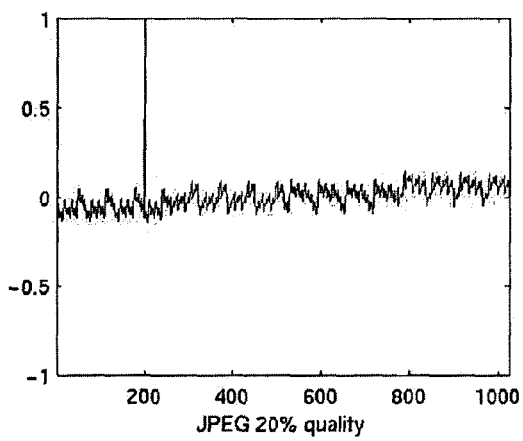
Figure 15:
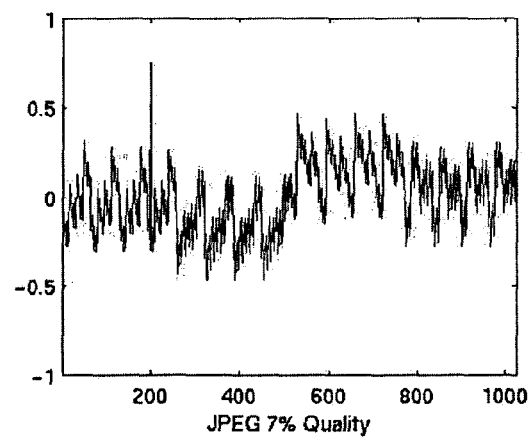

Compression was performed on the watermarked image, and the results show that the watermark can still be detected when the compression quality parameter is down to 7%. FIG. 14 shows the compressed Lena image with quality 7%. It can be seen that the image is visibly distorted and the blocking effect of DCT coding is clearly seen. The correlation detector responses of JPEG compressed images with compression quality parameters of 95%, 50%, 20% and 7% are shown in FIG. 15. The compression ratios for the Lena image under these quality factors are 2.85:1, 12.36:1, 20.76:1 and 34.03:1.

3.6. Combined Geometric Attack

Figure 16:
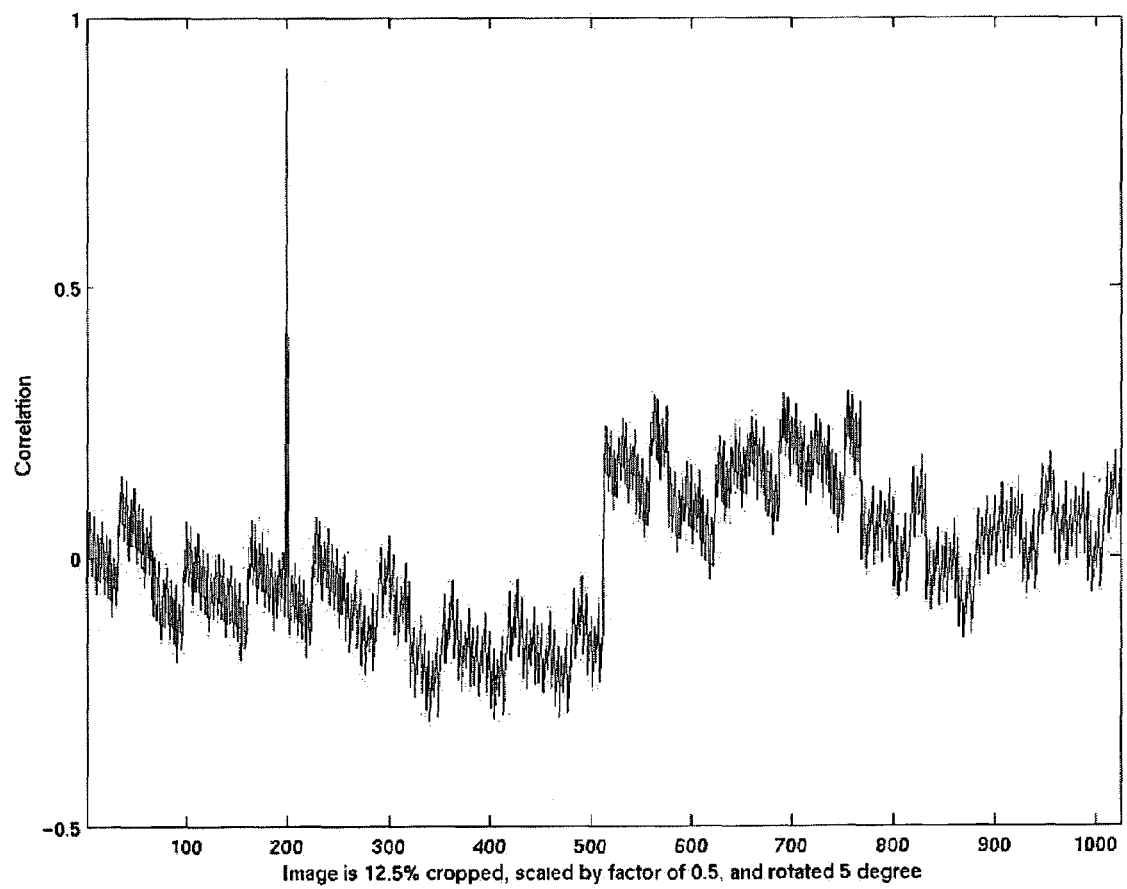
FIG. 16 shows a correlation detection response to an attacked image.

A combined geometric transformation was also performed on the watermarked image. The image was first cropped to 448×448 and rotated counter-clockwise by 5 degrees, and then scaled to 256×256. FIG. 16 shows the correlation detection response to the attacked image. It can be seen that the correlation with the correct watermark is 0.9072, and again well above the correlation with other sequences.

3.7. Camcorder Recording Attack

Figure 17:
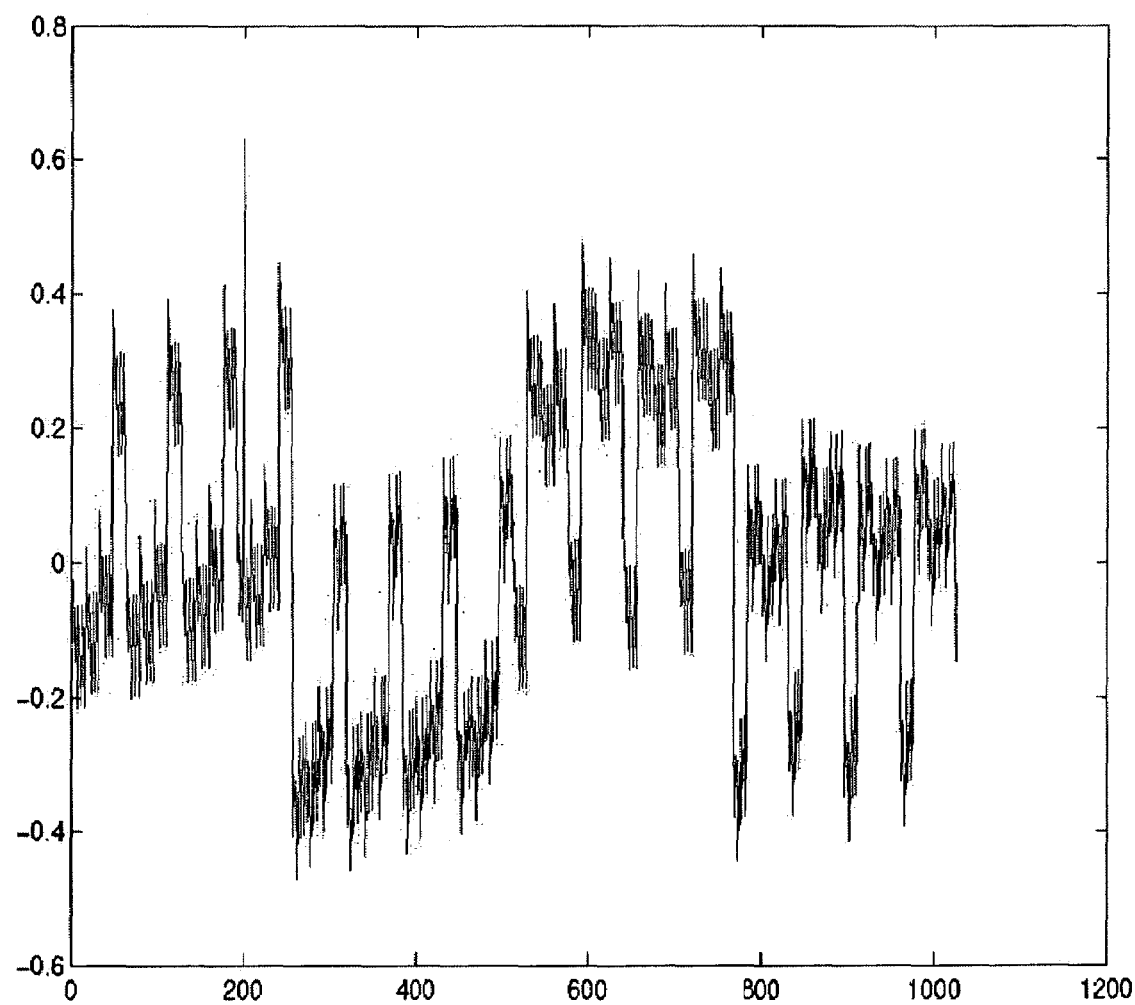
FIG. 17 shows a somewhat noisy correlation response.
Figure 18:
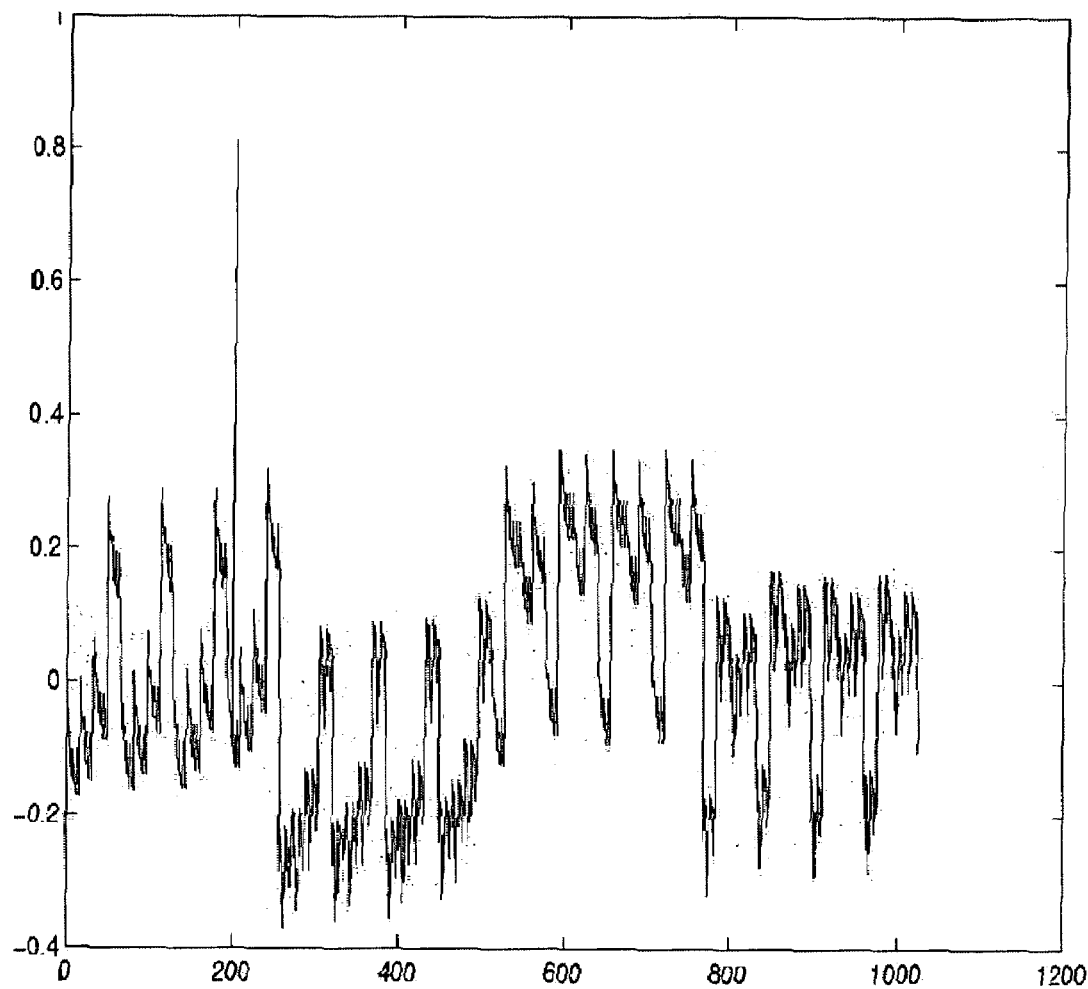
FIG. 18 shows a correlation response for an average correlation of 0.885266.

The watermarked Lena image was also recorded with a camcorder. First, the embedding bands were set starting from 18 ($R_{1,i}$=18). With embedding strength λ=0.1, the average correlation of the detected watermark with the original watermark was 0.628967 over 10 recorded images and 9 out 10 were correctly detected. FIG. 17 shows the somewhat noisy correlation response for this case. Then, with the same embedding location, the embedding strength was increased to 0.3. Now, an average correlation of 0.885266 was obtained and FIG. 18 shows the correlation response.

Figure 19:
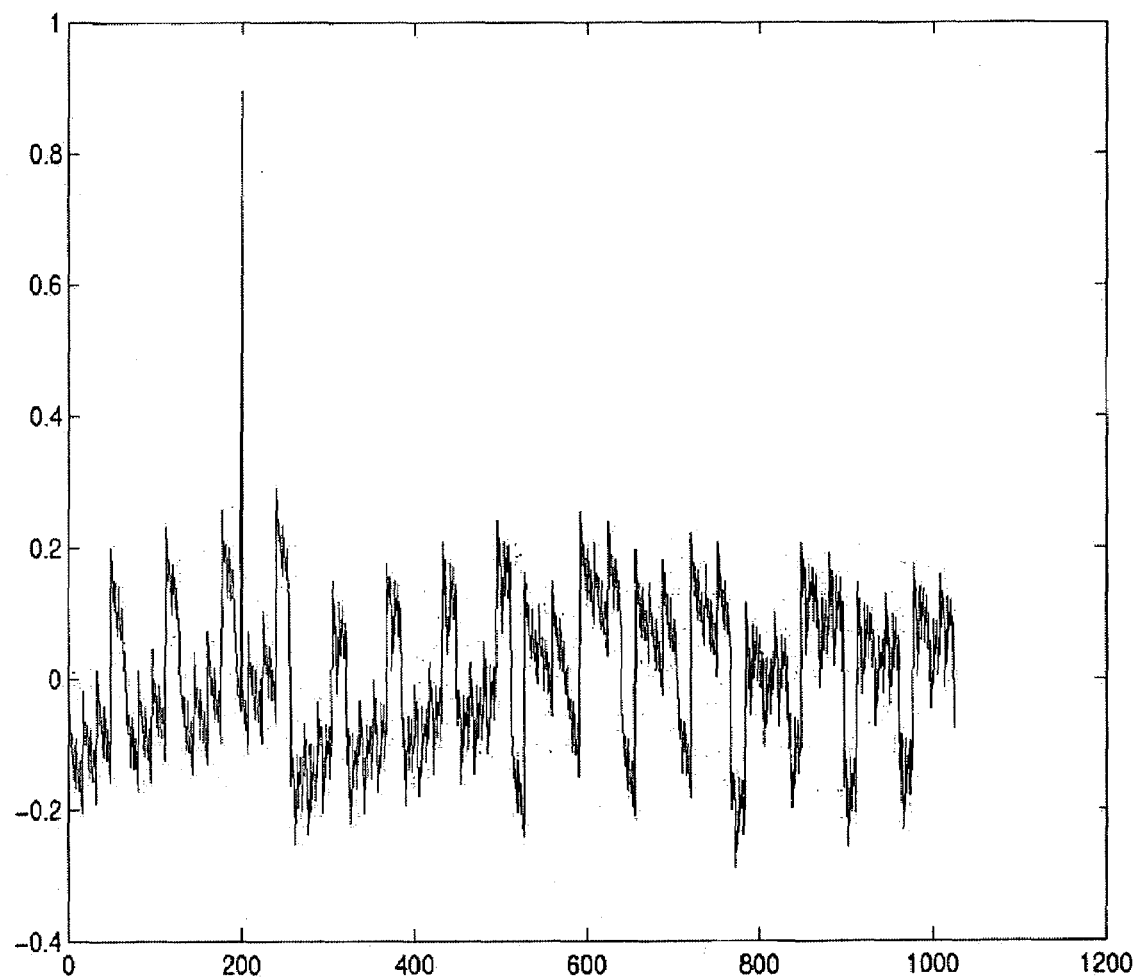
FIGS. 19 and 20 show the correlation responses for embedding strengths 0.3 and 0.5, respectively.
Figure 20:
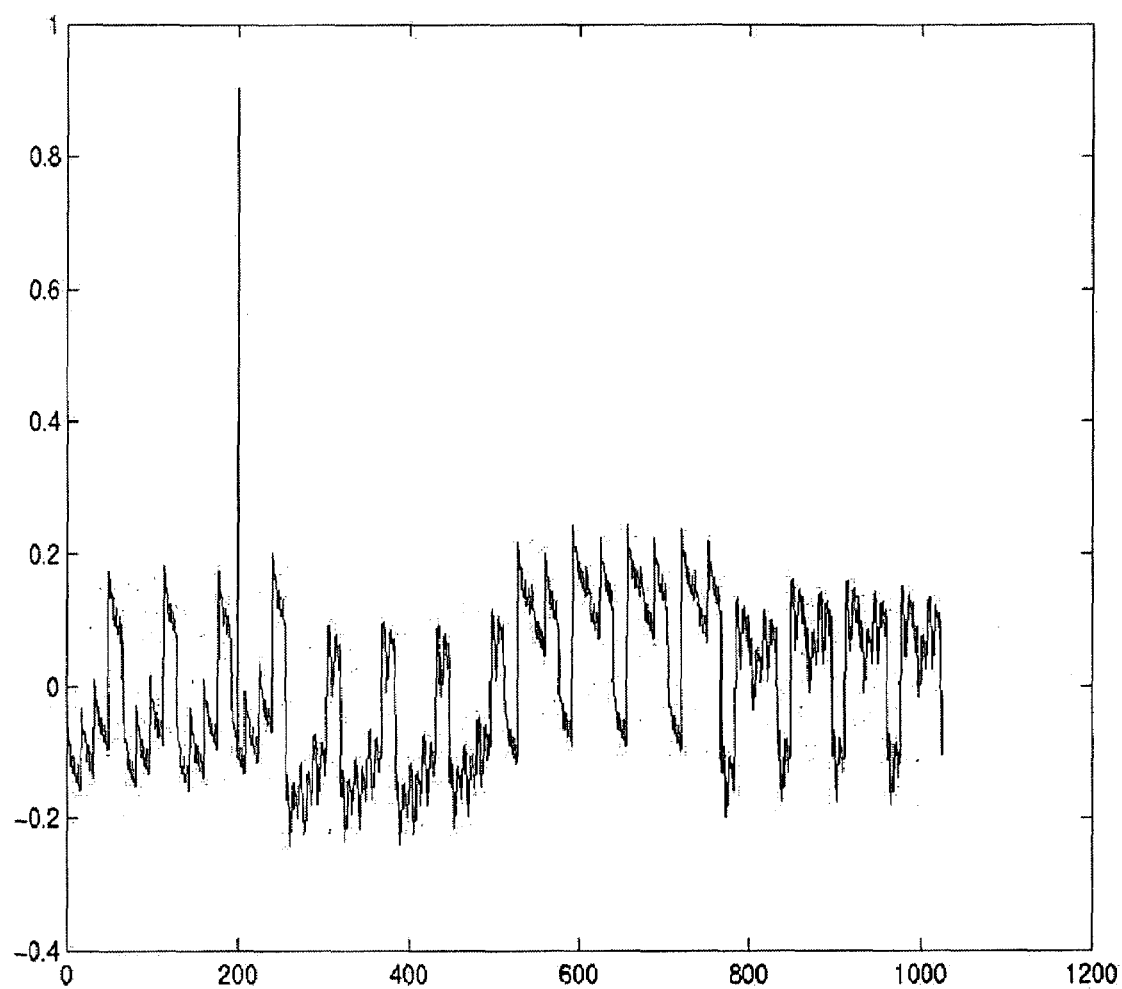

Then, the embedding bands was moved towards a higher frequency with $R_{1,i}$=28. And, the cases with embedding strengths 0.3 and 0.5 were tested. FIGS. 19 and 20 show the correlation responses for these two cases. The average correlations with the watermark were 0.817422 for λ=0.3 and 0.894329 for λ=0.5.

Thus, the correlation response becomes stronger as the embedding strength is increased or the embedding location is moved towards low frequency bands. This is the tradeoff between the robustness of the watermark and the visual quality of the watermarked image.

4. Summary

The present invention introduces a novel watermark algorithm to embed and detect a watermark pattern by exploiting the characteristics of DFT transformation of images/videos. The present invention implements a DFT feature-based watermarking algorithm resilient to geometric attacks. The watermark bits are spread into sets of circular bands in the amplitude of the DFT domain. The watermarking scheme is resilient to image scaling, rotation, cropping and JPEG compression. For video sequences, the watermark is embedded into the luminance component of each frame.

5. References

The following references are incorporated by reference herein:

[1] Ingemar, J. Cox, Joe Kilian, F. Thomson Leighton, and Talal Shamoon, Secure Spread Spectrum Watermarking for Multimedia. IEEE Transactions on Image Processing, Vol. 6, No. 12, December 1997

[2] E. Koch, J. Rindfrey, and J. Zhao, "Copyright protection for multimedia data." In Proc. Int. Conf. Digital Media and Electronic Publishing, 1994

[3] M. D. Swanson, B. Zhu, and A. H. Tewfik, "Multi-resolution scene-based video watermarking using perceptual models," IEEE Journal on Selected Areas in Communications, Vol. 16, No. 4, pp. 540-550, May 1998.

[4] S. Pereira and T. Pun. Fast Robust Template Matching for Affine Resistant Image Watermarks. "Proc. 3rd Int. Information Hiding Workshop, 207-218, 1999.

[5] C. Y. Lin and M. Wu and J. A. Bloom and I. J. Cox and M. L. Miller and Y. M. Lui. Rotation, Scale, and Translation Resilient Watermarking for Images, IEEE Trans. on Image Processing, Vol. 10, 767-782, May 2001.

[6] V. Solachidis and I. Pitas. Circularly Symmetric Watermark Embedding in 2-D DFT Domain. IEEE Trans. on Image Processing, Vol. 10, 1741-1753, November 2001.

[7] R. B. Wolfgang, C. I. Podilchuk, and E. J. Delp, "Perceptual watermarks for digital images and videos," Proceedings of the IEEE, Special Issue on Identification and Protection of Multimedia Information, Vol. 87, No. 7, pp. 1108-1126, July 1999.

6. Conclusion

This concludes the description of the preferred embodiment of the invention. The following describes some alternative embodiments for accomplishing the present invention. For example, different types of digital data, transformation and feature selection could be used with the present invention. In addition, different sequences of functions could be used than those described herein.

In summary, the present invention discloses a method and apparatus for embedding a watermark in digital data. A Y component of a Y, U(Cb), V(Cr) digital data stream representing color components of digital video is extracted as the digital data for embedding the watermark. The digital data is then scaled to a standard size. A Discrete Fourier Transform (DFT) is performed on the digital data, and a magnitude domain of the Discrete Fourier Transform is computed. The watermark is embedded into selected frequency bands of the computed magnitude domain of the Discrete Fourier Transform, thereby creating a watermarked magnitude domain. The selected frequency bands comprise one or more middle frequency bands, and the middle frequency bands comprise a band of circular rings of the magnitude domain. An inverse Discrete Fourier Transform is performed on the watermarked magnitude domain to reconstruct the digital data with the embedded watermark.

The present invention also discloses a method and apparatus for detecting a watermark in digital data. A Y component of a Y, U(Cb), V(Cr) digital data stream representing color components of digital video is extracted as the digital data for embedding the watermark. The digital data is then scaled to a standard size. A Discrete Fourier Transform (DFT) is performed on the digital data, and a magnitude domain of the Discrete Fourier Transform is computed. The watermark is detected and/or extracted from selected frequency bands of the computed magnitude domain of the Discrete Fourier Transform. The selected frequency bands comprise one or more middle frequency bands, and the middle frequency bands comprise a band of circular rings of the magnitude domain.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A method of embedding a watermark in digital data, comprising:
   (a) scaling the digital data to a standardized size;
   (b) performing a Discrete Fourier Transform (DFT) on the scaled digital data;
   (c) computing a magnitude domain of the Discrete Fourier Transform;
   (d) embedding each bit of the watermark into a feature element of a band of circular rings generated from selected frequency bands of the computed magnitude domain of the Discrete Fourier Transform, thereby creating a watermarked magnitude domain; and
   (e) performing an inverse Discrete Fourier Transform on the watermarked magnitude domain to reconstruct the digital data with the embedded watermark.

2. The method of claim 1, further comprising extracting a Y component of a Y, U(Cb), V(Cr) digital data stream representing color components of digital video as the digital data.

3. The method of claim 1, wherein the selected frequency bands comprise one or more middle frequency bands.

4. The method of claim 3, wherein the middle frequency bands comprise the band of circular rings of the magnitude domain.

5. An apparatus for embedding a watermark in digital data, comprising
   (a) means for scaling the digital data to a standardized size;
   (b) means for performing a Discrete Fourier Transform (OFT) on the scaled digital data;
   (c) means for computing a magnitude domain of the Discrete Fourier Transform;
   (d) means for embedding each bit of the watermark into a feature element of a band of circular rings generated from selected frequency bands of the computed magnitude domain of the Discrete Fourier Transform, thereby creating a watermarked magnitude domain; and
   (e) means for performing an inverse Discrete Fourier Transform on the watermarked magnitude domain to reconstruct the digital data with the embedded watermark.

6. The apparatus of claim 5, further comprising means for extracting a Y component of a Y, U(Cb), V(Cr) digital data stream representing color components of digital video as the digital data.

7. The apparatus of claim 5, wherein the selected frequency bands comprise one or more middle frequency bands.

8. The apparatus of claim 7, wherein the middle frequency bands comprise the band of circular rings of the magnitude domain.

9. A method of detecting a watermark in digital data, comprising:
   (a) scaling the digital data to a standardized size;
   (b) performing a Discrete Fourier Transform (DET) on the sealed digital data;
   (c) computing a magnitude domain of the Discrete Fourier Transform; and
   (d) extracting each bit of the watermark from a feature element of a band of circular rings generated from selected frequency bands of the computed magnitude domain of the Discrete Fourier Transform.

10. The method of claim 9, further comprising extracting a Y component of a Y, U(Gb), V(Cr) digital data stream representing color components of digital video as the digital data.

11. The method of claim 9, wherein the selected frequency bands comprise one or mow middle frequency bands.

12. The method of claim 11, wherein the middle frequency bands comprise the band of circular rings of the magnitude domain.

13. An apparatus for detecting a watermark in digital data, comprising:
   (a) means for scaling the digital data to a standardized size;
   (b) means for performing a Discrete Fourier Transform (DEf) on the scaled digital data;
   (c) means for computing a magnitude domain of the Discrete Fourier Transform; and
   (d) means for enacting each bit of the watermark from a feature element of a band of circular rings generated from selected frequency bands of the computed magnitude domain of the Discrete Fourier Transform.

14. The apparatus of claim 13, further comprising means for extracting a Y component of a Y, U(Cb), V(Cr) digital data stream representing color components of digital video as the digital data.

15. The apparatus of claim 13, wherein the selected frequency bands comprise one or more middle frequency bands.

16. The apparatus of claim 15, wherein the middle frequency bands comprise the band of circular rings of the magnitude domain.

\* \* \* \* \*